United States Patent
Brodersen et al.

(10) Patent No.: US 6,266,669 B1
(45) Date of Patent: Jul. 24, 2001

(54) PARTIALLY REPLICATED DISTRIBUTED DATABASE WITH MULTIPLE LEVELS OF REMOTE CLIENTS

(75) Inventors: Robert A. Brodersen, Redwood City; Prashant Chatterjee, Saratoga; Peter S. Lim, Redwood City, all of CA (US)

(73) Assignee: Siebel Systems, Inc., San Mateo, CA (US)

( * ) Notice: Subject to any disclaimer, the term of this patent is extended or adjusted under 35 U.S.C. 154(b) by 0 days.

(21) Appl. No.: 09/373,128

(22) Filed: Aug. 12, 1999

Related U.S. Application Data

(63) Continuation of application No. PCT/US98/03752, filed on Feb. 24, 1998.
(60) Provisional application No. 60/039,230, filed on Feb. 27, 1997.

(51) Int. Cl.$^7$ ....................................................... G06F 17/30
(52) U.S. Cl. .................................. 707/10; 707/1; 707/4; 707/100; 707/202; 709/203
(58) Field of Search ............................ 707/10, 1, 4, 100, 707/202; 709/203

(56) References Cited

U.S. PATENT DOCUMENTS

| | | | |
|---|---|---|---|
| 5,664,183 | 9/1997 | Cirulli et al. ........................ | 707/103 |
| 5,680,615 | 10/1997 | Marlin et al. ........................ | 707/103 |
| 5,745,897 | 4/1998 | Perkins et al. ....................... | 707/101 |
| 5,754,763 | 5/1998 | Bereiter .............................. | 713/201 |
| 5,757,669 | * 5/1998 | Christie et al. ............... | 364/514.006 |
| 5,764,899 | 6/1998 | Eggleston et al. ................... | 709/203 |
| 5,765,038 | 6/1998 | Flannery et al. ..................... | 707/10 |
| 5,781,910 | * 7/1998 | Gostanian et al. ................... | 707/201 |
| 5,826,269 | * 10/1998 | Hussey ................................ | 707/10 |
| 5,956,489 | * 9/1999 | San Andres et al. ........... | 395/200.51 |

* cited by examiner

*Primary Examiner*—Jack Choules
*Assistant Examiner*—Cheryl Lewis
(74) *Attorney, Agent, or Firm*—Cooley Godward LLP

(57) ABSTRACT

A method of and system for collecting, storing, and retrieving data in a data base management system. The database management system includes a master database server (4), at least one workgroup server (315), and a plurality of workgroup user clients (310). The workgroup server (315) is interposed between the master database server (4) and said workgroup user clients (310). The method creating a transaction in a local database resident on one of the workgroup user clients (310), entering the transaction into a transaction log resident on the workgroup user client (310), and creating a transaction file corresponding to the transaction in an outbox of said workgroup user client (310). Next, the transaction file is copied to an inbox identified to the workgroup user client (310) and updating the transaction file into a workgroup database (305) resident on the workgroup server (315). The workgroup database (305) includes a transaction log.

20 Claims, 10 Drawing Sheets

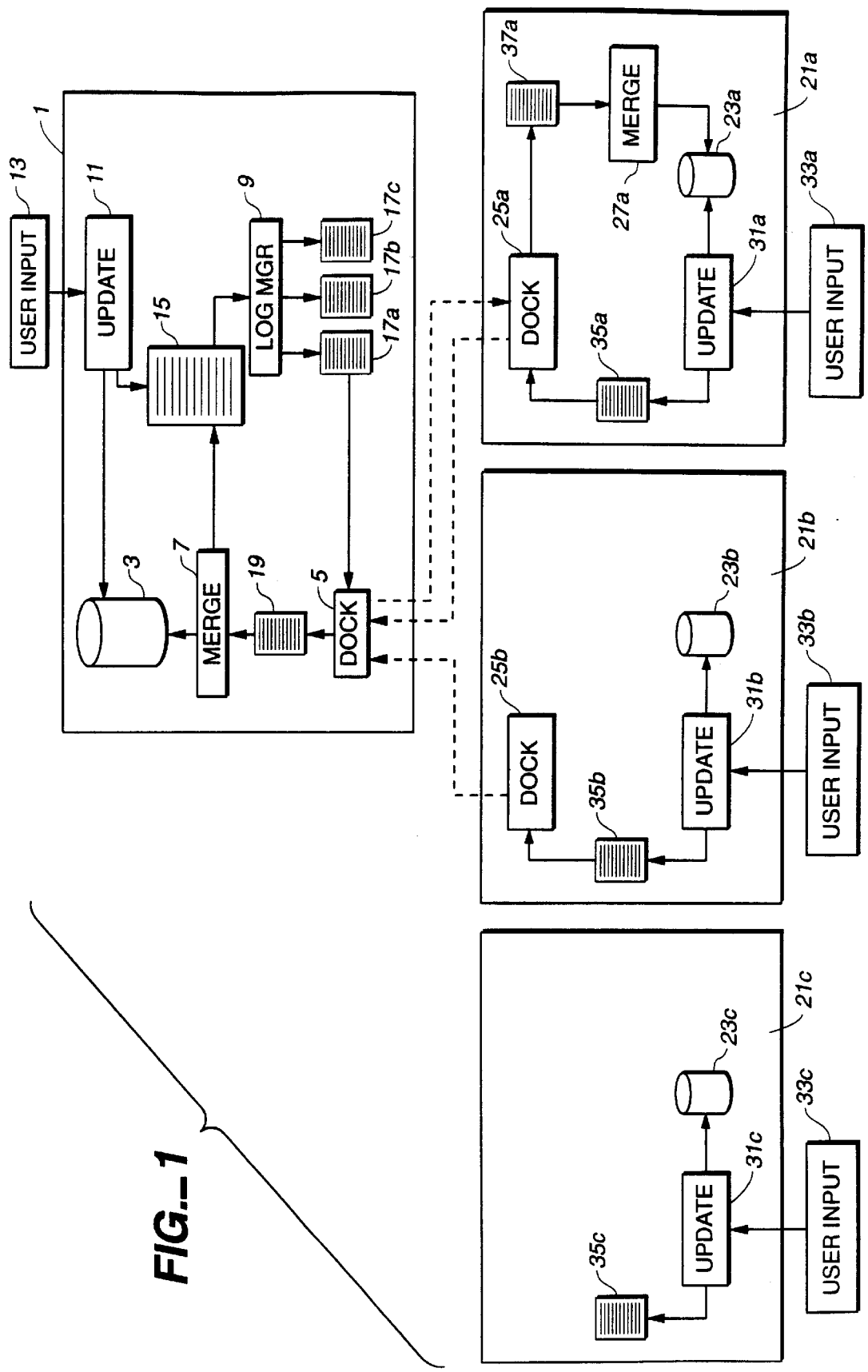
FIG._1

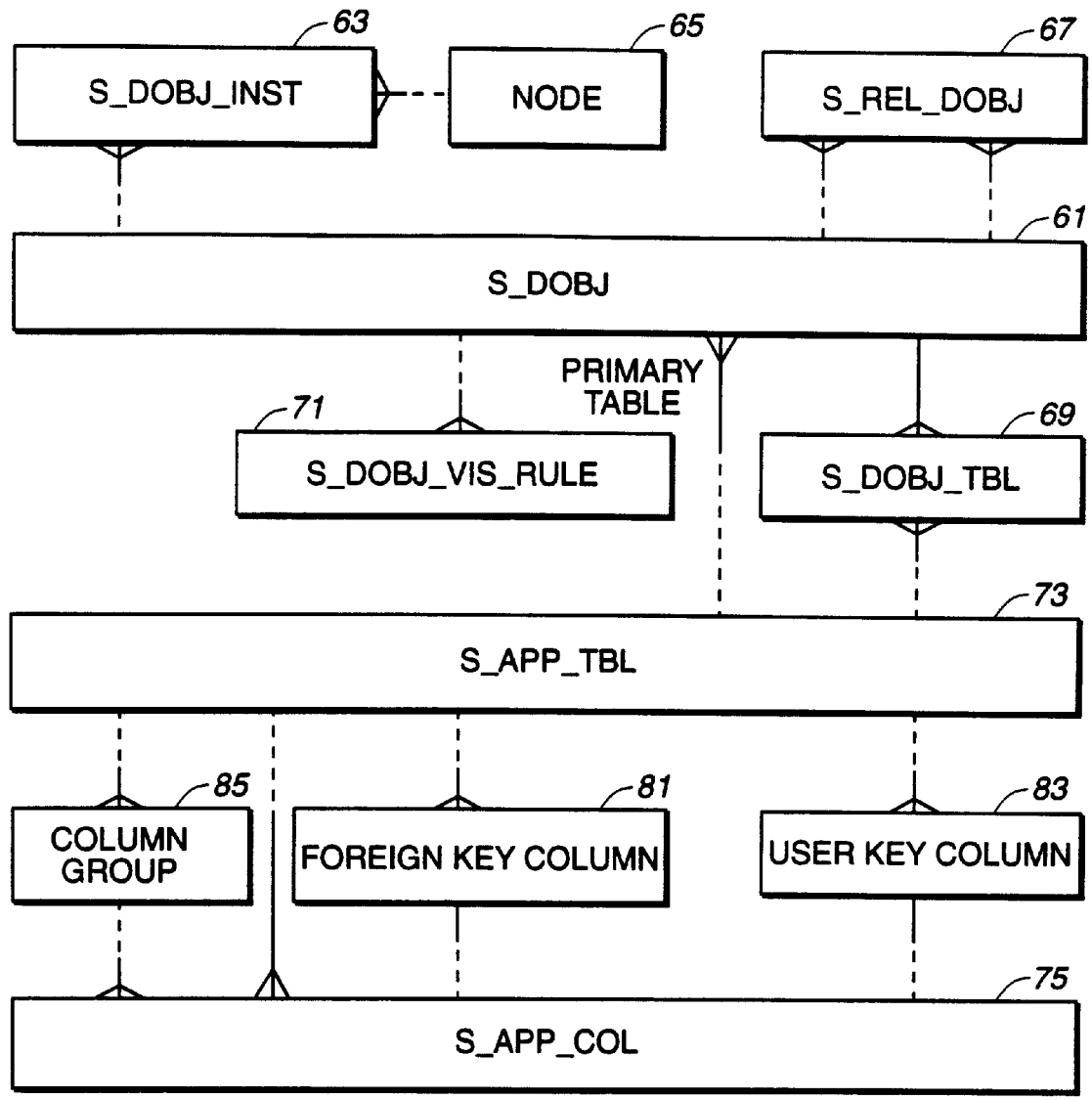
FIG._2

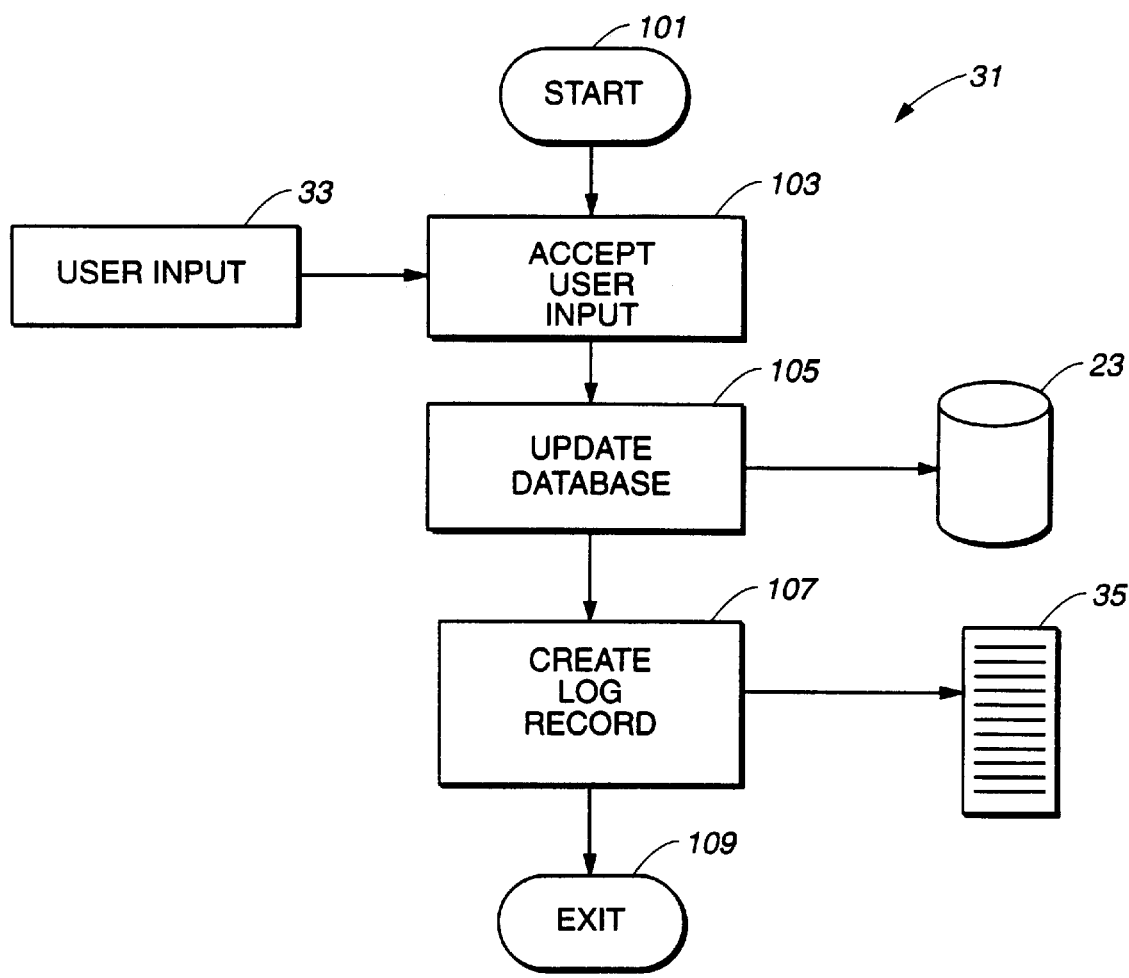
FIG._3

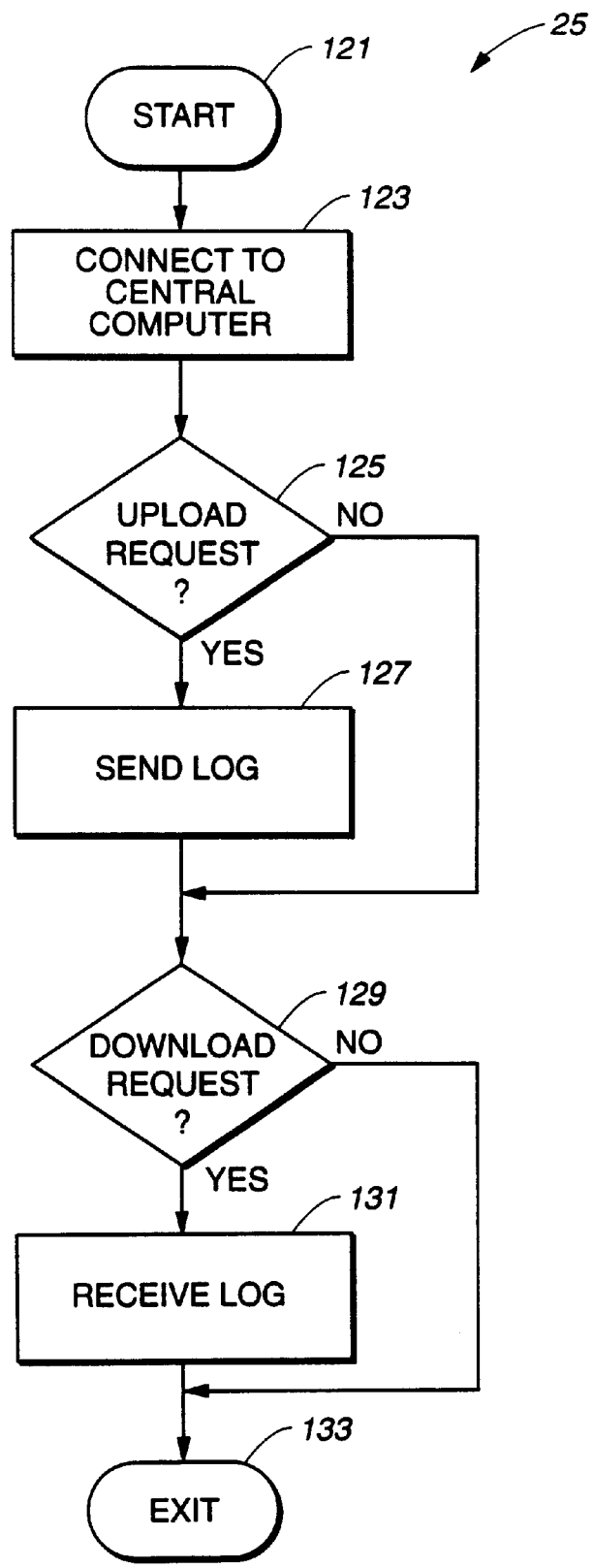
FIG._4

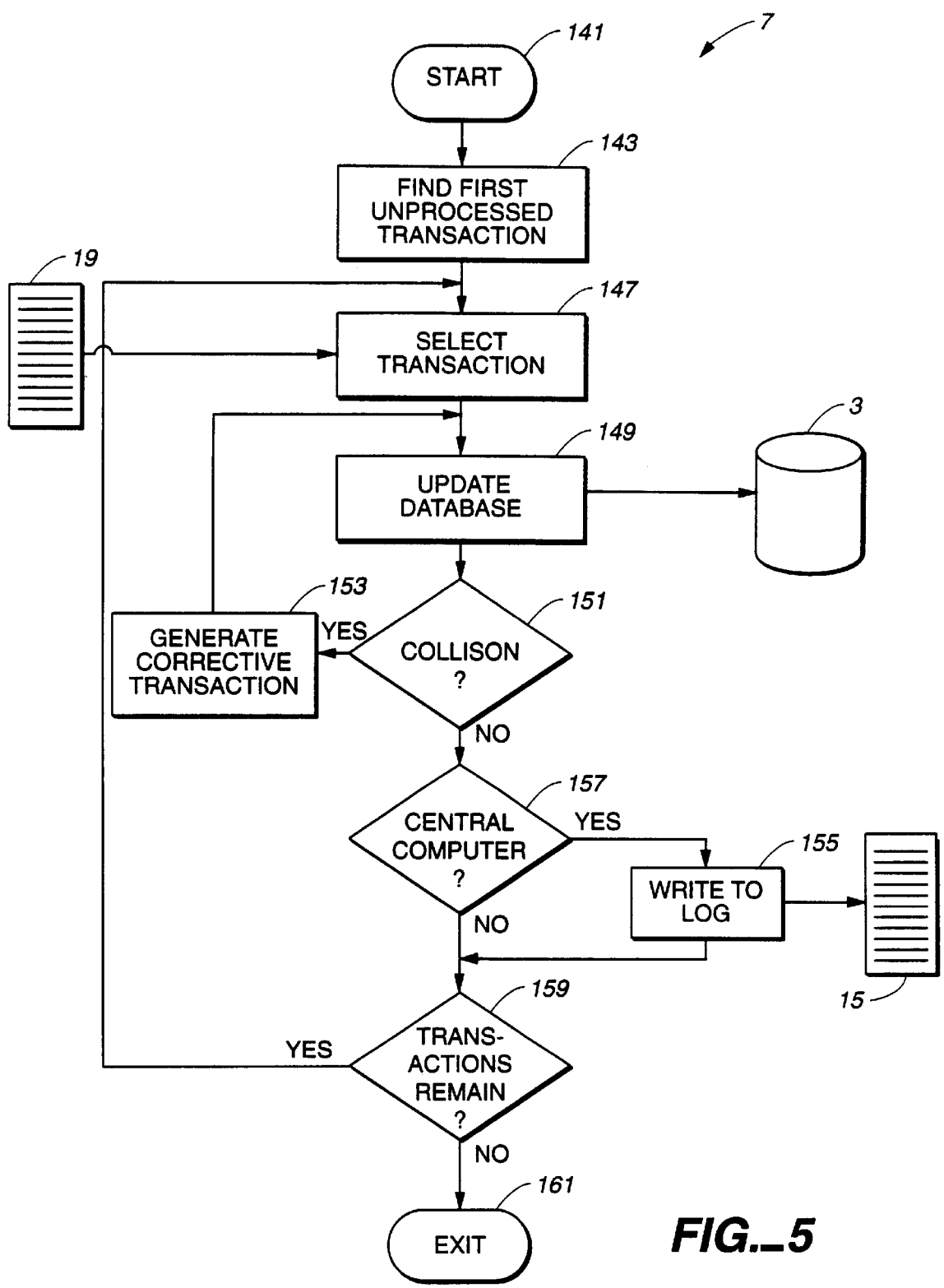
FIG._5

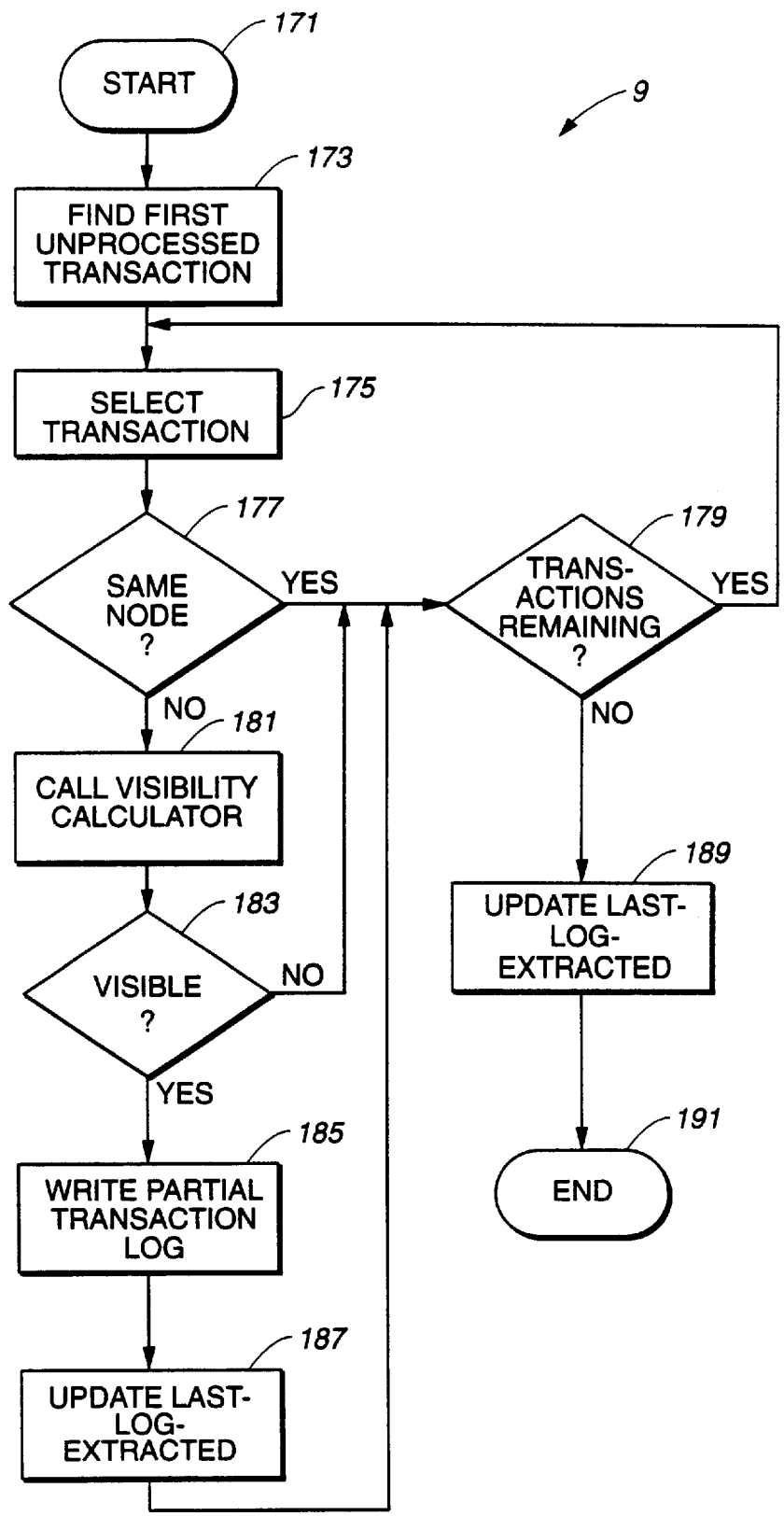
FIG._6

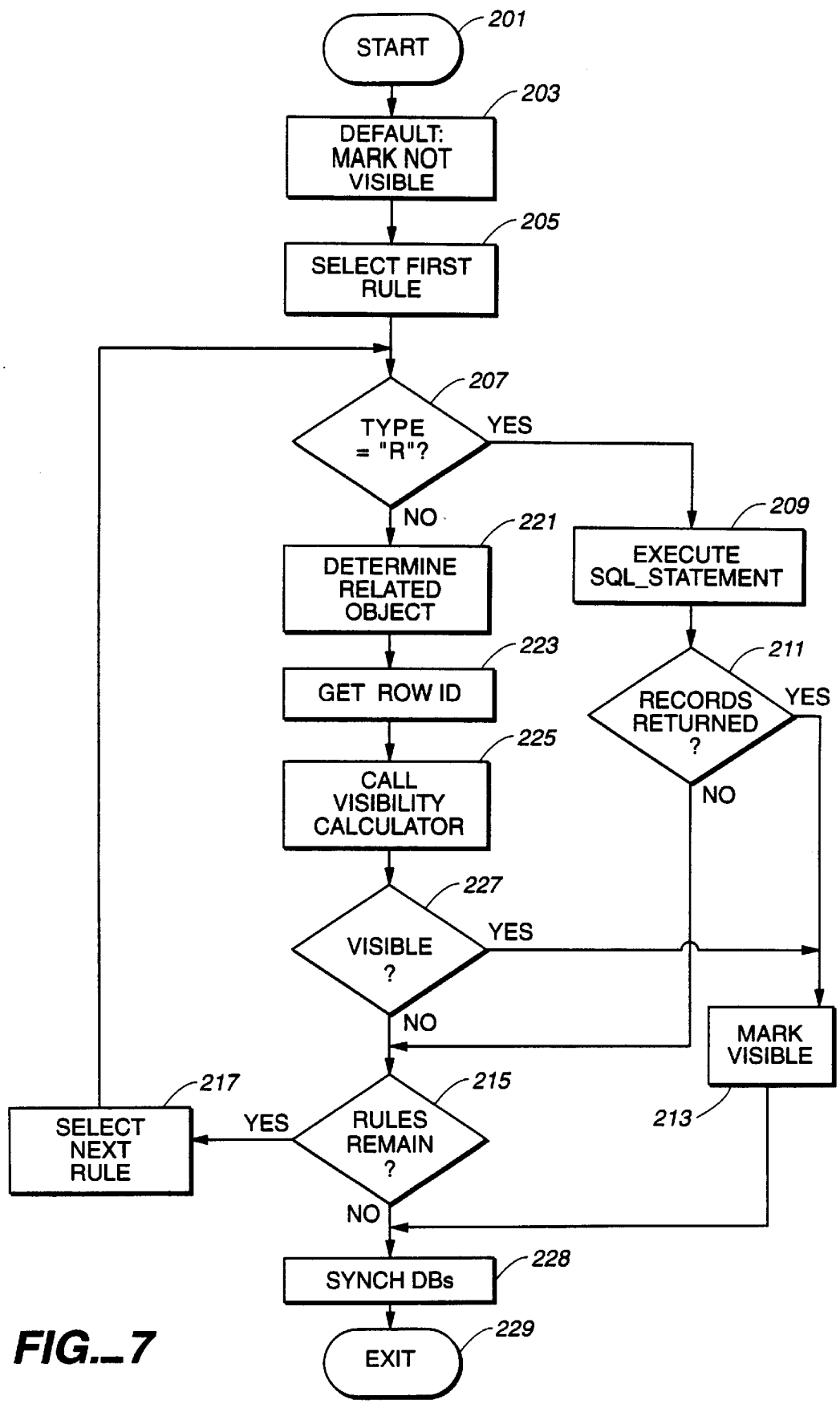
FIG._7

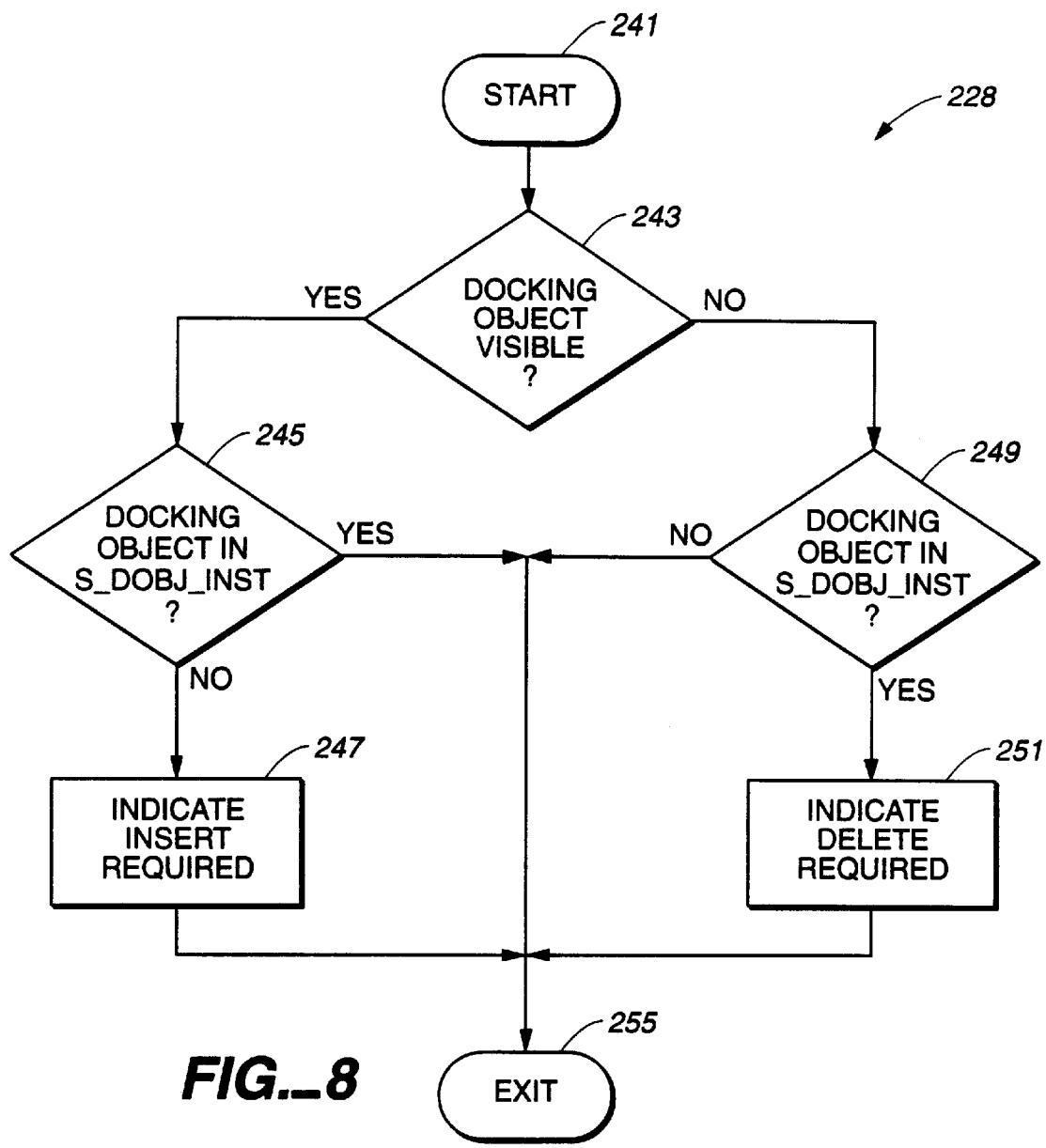
FIG._8

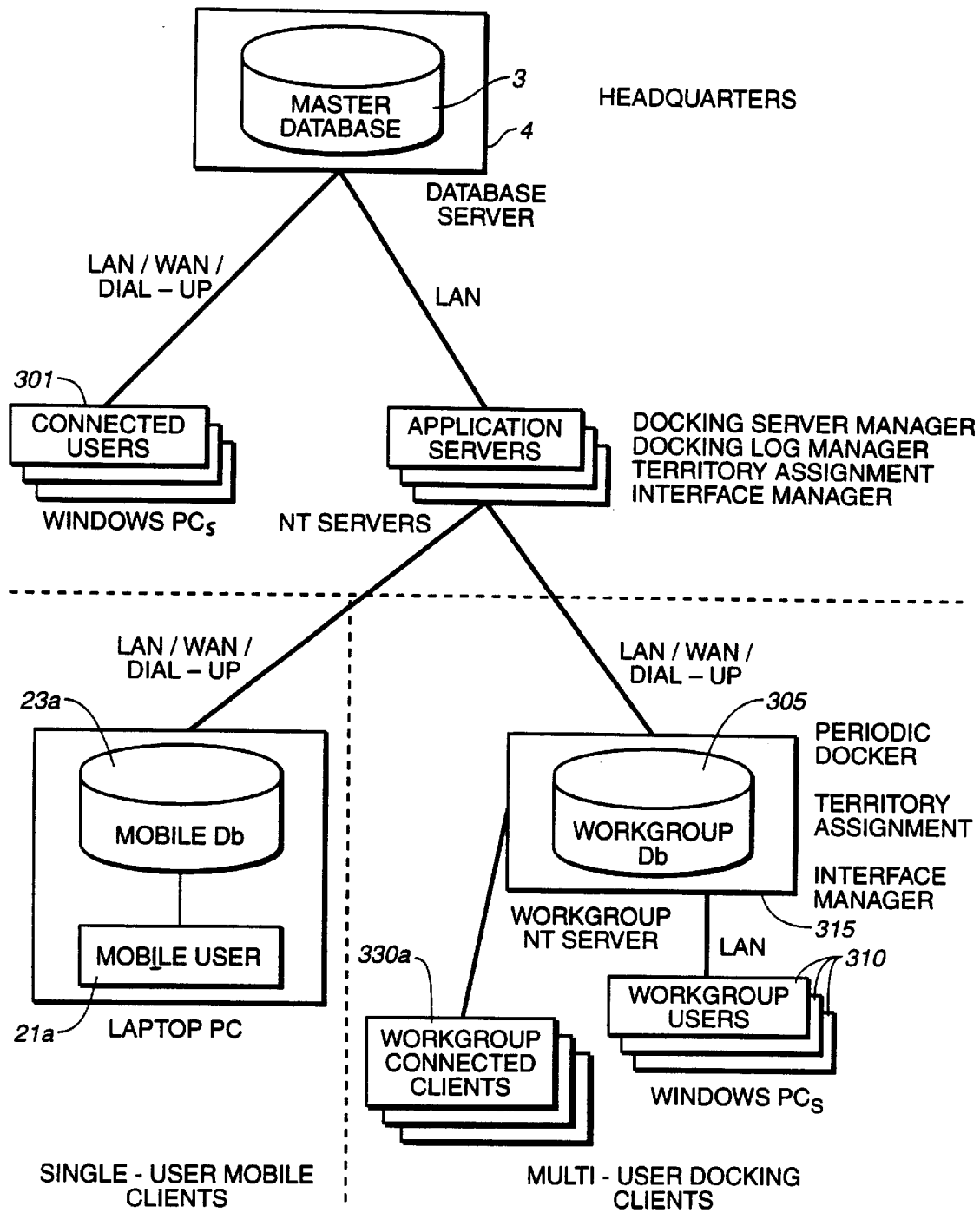
FIG._9

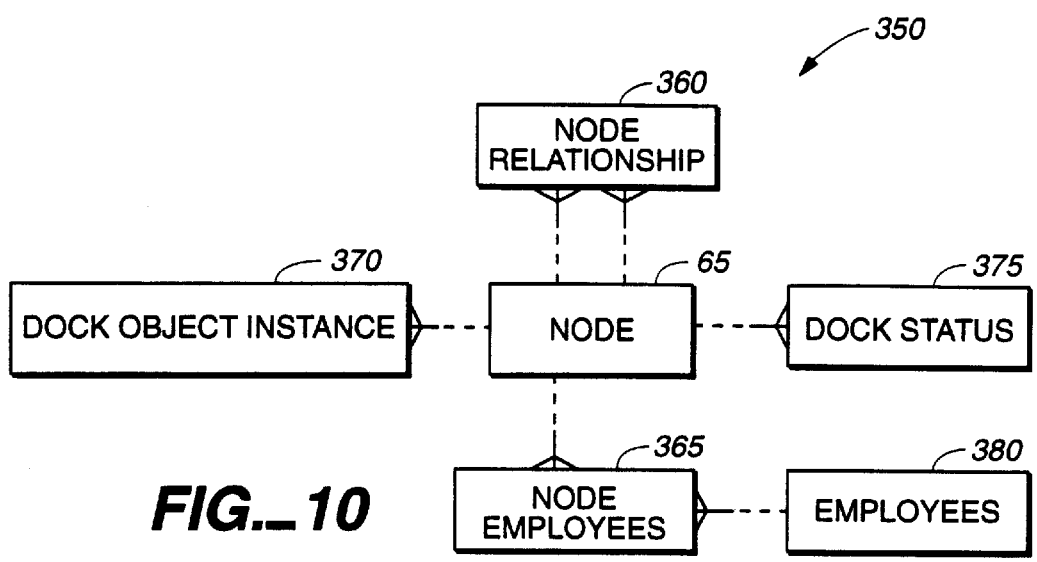
FIG._10

PARTIALLY REPLICATED DISTRIBUTED DATABASE WITH MULTIPLE LEVELS OF REMOTE CLIENTS

CROSS REFERENCE TO RELATED APPLICATIONS

This application is a continuation application under the provisions of 0.35 USC §120 of PCT International Application No. PCT/US98/03752, filed Feb. 24, 1998, itself claiming the benefit of the filing date of U.S. Provisional Application No. 60/039,230 filed Feb. 27, 1997.

INTRODUCTION

I. Technical Field

This invention relates to a system and method for providing updates to a network of partially replicated relational database systems, and, more particularly, for providing an efficient means for computing the visibility to a client on the network of a transaction processed against the database.

II. Background

Relational databases are a commonly-employed data structure for representing data in a business or other environment. A relational database represents data in the form of a collection of two-dimensional tables. Each table comprises a series of cells arranged in rows and columns. Typically, a row in a table represents a particular observation. A column represents either a data field or a pointer to a row in another table.

For example, a database describing an organizational structure may have one table to describe each position in the organization, and another table to describe each employee in the organization. The employee table may include information specific to the employee, such as name, employee number, age, salary, etc. The position table may include information specific to the position, such as the position title ("salesman", "vice president", etc.), a salary range, and the like. The tables may be related by, for example, providing in each row of the employee table a pointer to a particular row in the position table, coordinated so that, for each row in the employee table, there is a pointer to the particular row in the position table that describes that employee's position. A relational database management system (RDBMS) supports "joining" these tables in response to a query from a user, so that the user making a query about, for example, a particular employee, may be provided with a report of the selected employee, including not only the information in the employee table, but also the information in the related position table.

Relational databases may be much more complex than this example, with several tables and a multiplicity of relations among them.

With the widespread use of inexpensive portable computers, it is advantageous to replicate a database onto a portable computer for reference at locations remote from the central computer. The replicated database may then be referenced by the user of the portable computer, without requiring reference to the main database, which may be maintained at a central location inconvenient to the user of the portable computer. However, there are a number of difficulties with the use of a replicated database.

One disadvantage is that a fill copy of the central database may require more data storage than is desired or economical. For example, a salesman working in the field may need to refer to the database for information regarding sales opportunities in his sales area, but have no need to refer to any information regarding sales opportunities outside of his area. One possible approach to reduce the amount of required data storage is to simply replicate only that portion of the database that is needed by the user. However, this approach does not recognize that the criteria to determine which portions of the data are required is likely to vary over time. For example, the salesman may have a new city added to his territory. Under conventional approaches, the salesman would need to re-replicate his local copy of the database, this time selecting data including the added city. Such a practice is inconvenient, subject to error, and time-consuming.

A further disadvantage to a replicated database is the difficulties encountered in attempting to update data using the replicated copy. A change made to the replicated database is not made to the central database, leading to a discrepancy between the information that is stored in the replicated copy of the database and the information that is stored in the central database. Although it is possible to journal modifications made to the replicated copy and apply an identical modification to the central database, one problem that this approach faces is the possibility of colliding updates; that is, where a user of a replicated copy makes a change to data that is also changed by a user of the central copy or by the user of another replicated copy.

It is therefore desirable to provide a capability to maintain one or more partially-replicated copies of a central database, in such a way that the degree of replication may be easily changed without requiring a refresh of the entire replicated database, and that permits updates to be coordinated among users of the central database and users of the partially replicated databases.

SUMMARY OF THE INVENTION

The present invention is directed to a method of maintaining a partially replicated database in such a way that updates made to a central database, or to another partially replicated database, are selectively propagated to the partially replicated database. Updates are propagated to a partially replicated database if the owner of the partially replicated database is deemed to have visibility to the data being updated. Visibility is determined by use of predetermined rules stored in a rules database. In one aspect of the invention, the stored rules are assessed against data content of various tables that make up a logical entity, known as a docking object, that is being updated.

In another aspect of the invention, the stored rules are assessed against data content of one or more docking objects that are not necessarily updated, but that are related to a docking object being updated. In one embodiment, the visibility attributes of the related docking objects are recursively determined.

In yet another aspect of the invention, changes in visibility are determined to enable the central computer to direct the nodes to insert the docking object into its partially replicated database. Such changes in visibility are determined so as to enable the central computer to direct a node to remove a docking object from its partially replicated database.

In a further aspect of the invention, the predetermined rules are in declarative form and specify visibility of data based upon structure of the data without reference to data content.

In still another aspect of the invention, the database is configured to support a plurality of users in a single docking entity. More particularly, one aspect of the invention is a method of collecting, storing, and retrieving data in a data base management system having a master database server (4), an application server (303), at least one workgroup server (315), and a plurality of workgroup user clients (310). In this embodiment of the invention the workgroup server (315) is interposed between the master database server (4) and said workgroup user clients (310). The method of this embodiment of our invention includes creating a transaction in a local database resident on one of the workgroup user clients (310), entering the transaction into a transaction log resident on the workgroup user client (310), and creating a transaction file corresponding to the transaction in an outbox of the workgroup user client (310). In this embodiment of our invention, the next step is copying the transaction file to an inbox identified to the workgroup user client (310) and updating the transaction file into a workgroup database (305) resident on the workgroup server (315), where the workgroup database (305) includes a transaction log. The next step in the method of our invention includes reading the workgroup database (305) transaction log, skipping those transactions which originate at the master database server (4) so as to avoid looping, and creating data files corresponding to the entries in the transaction log. These entries are copied to an inbox on the master database server (4) which corresponds to entries on the workgroup server (315). These entries are used to update the transactions into a master database (3) on the master database server (4).

In another aspect of the invention, the database is configured to support a plurality of users. More particularly, one aspect of the invention is a method of collecting, storing, and retrieving data in a database management system having a master database server (4), at least one workgroup server (315), and one or more workgroup connected clients (330-a). In this embodiment of the invention the workgroup server (315) is directly connected to the workgroup connected clients (330-a). The method of this embodiment of our invention includes creating a transaction in a local database resident on one of the workgroup connected clients (330-a), entering the transaction into a transaction log resident on the workgroup connected client (330-a), and creating a transaction file corresponding to the transaction in an outbox of the workgroup connected client (330-a). In this embodiment of our invention, the next step is copying the transaction file to an inbox identified to the workgroup connected client (330-a) and updating the transaction file into a workgroup database (305) resident on the workgroup server (315), where the workgroup database (305) includes a transaction log. The transactions are directly entered into the transaction log in the workgroup server (315).

A still further embodiment of our invention is its incorporation into an article of manufacture, that is, a disk, a tape, or the like. The article is a computer usable, i.e., readable, medium having computer readable program code for collecting, storing, and retrieving data in a database management system. The database management is one, as described above, having a master database server (4), an application server (303), at least one workgroup server (315), and a plurality of workgroup user clients (310), where the workgroup server (315) is interposed between the master database server (4) and the workgroup user clients (310). The computer readable program in the article of manufacture includes computer readable program code for causing a computer to create a transaction in a local database resident on one or more of the individual workgroup user clients (310), and entering the transaction into a transaction log resident on one of the workgroup user clients (310), that is, the workgroup user client (310) where the transaction originated, and creating a transaction file corresponding to the transaction in an outbox of the workgroup user client (310). In this embodiment of our invention the computer readable program code causing the computer to effect copying the transaction file to an inbox identified to the workgroup user client (310) and updating the transaction file into a workgroup database (305) resident on the workgroup server (315). The workgroup database (305) includes a transaction log. Finally, the computer readable program code causes the computer to effect reading the workgroup database (305) transaction log, skipping those transactions which originate at the master database server (4), to avoid looping, creating data files corresponding to the entries therein, and copying the data files corresponding to transactions originating at the workgroup user client (310) to an inbox on the master database server (4) corresponding to the workgroup server (315). Next, the transactions are updated into a master database (3) on the master database server (4).

A still further aspect of our invention is a program storage device readable by a machine, tangibly embodying a program of instructions executable by a machine to perform method steps for collecting, storing, and retrieving data, that is, in a data base management system having a master database server (4), an application server (303), at least one workgroup server (315), and a plurality of workgroup user clients (310), where the workgroup server (315) is interposed between the master database server (4) and said workgroup user clients (310). In this embodiment the code causes the database management system resident on a workgroup client to create a transaction in a local database resident on the workgroup user clients (310), enter the transaction into a transaction log resident on the workgroup user client (310), and create a transaction file corresponding thereto in an outbox of said workgroup user client (310). Next, the transaction file is caused to be copied to an inbox identified to the workgroup user client (310) and the transaction file is updated into a workgroup database (305) resident on the workgroup server (315). To be noted is that the workgroup database (305) includes a transaction log. Next, the software reads the workgroup database (305) transaction log, skipping those transactions which originated at the master database server (4), that is, to avoid looping, creating data files corresponding to the entries in the transaction log, and copying data files corresponding to transactions originating at the workgroup user client (310) to an inbox on the master database server (4) corresponding to the workgroup server (315), and updating the transactions into a master database (3) on the master database server (4).

BRIEF DESCRIPTION OF THE DRAWINGS

FIG. 1 depicts an overview of the operation of one embodiment of the present invention.

FIG. 2 depicts a database schema that shows the relationship of the various components that make up a Docking Object.

FIG. 3 depicts steps performed by an update manager to update a database.

FIG. 4 depicts steps performed by a Docking Manager to transmit and/or receive one or more transaction logs.

FIG. 5 depicts the steps performed by a merge processor to merge transaction log records into an existing database.

FIG. 6 depicts the steps performed by a log manager to prepare a partial transaction log.

FIG. 7 depicts the steps performed by a visibility calculator for calculating visibility for a docking object as invoked by a log manager.

FIG. 8 depicts the steps performed to synchronize a partially replicated database in response to a change in data visibility.

FIG. 9 depicts the logical database configured to support multi-user docking clients.

FIG. 10 depicts a database diagram describing the database design to support multi-user docking clients.

DESCRIPTION OF SPECIFIC EMBODIMENTS

Overview

FIG. 1 depicts an overview of the operation of one embodiment of the present invention. FIG. 1 depicts a central computer system 1 and three remote computer systems (or "nodes") 21-a, 21-b, and 21-b. Each of nodes 21-a, 21-b and 21-b are depicted in various states of communication with central computer system 1, as will be more fully explained. Central computer system 1 includes a central database 3, a docking manager 5, a merge processor 7 and a log manager 9. Central computer system 1 additionally optionally includes update manager 11 responsive to user input 13.

Node 21-a is a remote computer system, such as a mobile client such as a laptop computer. Node 21-a includes a partially replicated remote database 23-a, update manager 31-a responsive to user input 33-a, docking manager 25-a and merge manager 27-a. In operation, update manager is responsive to user input 33-a to make changes to remote database 23-a as directed by the operator of node 21-a. Updates made are recorded, or journaled, in node update log 35-a.

At some point at the convenience of the operator of node 21-a, node docking manager 35-a is activated, and enters into communication with central docking manager 5. Update log 35-a is taken as input by node docking manager 25-a, and provided to central docking manager 5. Central docking manager 5 creates a received node update log 19, which contains all the information that had been recorded in update log 35-a. Optionally, partial log 17-a is taken as input by central docking manager 5 and provided to node docking manager 25-a, as more fully described herein.

At some point in time, at the convenience of the operator of central computer system 1, merge processor 7 is activated. Merge processor 7 takes as input received node update log 19, and applies the updates described therein to central database 3. In the process of applying the updates from received node update log 19, merge processor journals the updates applied to central update log 15. Optionally, update manager 11, responsive to user input 12 makes additional changed to central database 3 as directed by the operator of central computer system 1. The updates made by update manager 11 are additionally journaled in central update log 15.

At some point in time, at the convenience of the operator of central computer system 1, log manager 9 is activated. Log manager 9 takes as input central update log 15 and produces as output a set of partial logs 17-a, 17-b and 17-c according to visibility rules as will be further described herein. Each of partial logs 17-a, 17-b and 17-c corresponds to one of nodes 21-a, 21-b and 21-b. When a node docking manager such as node docking manager 25-a enters into communication with central docking manager 5 and optionally requests transmission of its corresponding partial log, central docking manager 5 takes as input the appropriate partial log, such as partial log 17-a, and presents it to node docking manager 25-a. Node docking manager 25-a then replicates partial log 17-a as merge log 37-a.

At some point in the future, at the convenience of the operator of node 21-a, merge processor 27-a is activated. Merge processor 27-a takes as input merge log 37-a, and applies the updates described therein to partially replicated database 23-a.

In addition to node 21-a, FIG. 1 also depicts two additional nodes 21-b and 21-c. Node 21-b is depicted in communication with central computer 1. However, unlike node 21-a, the operator of node 21-b has requested only to send his updates to central computer system 1, and has not requested to be presented with changes made elsewhere to be made to his partially replicated database 23-b. This may be, for example, if the operator has an urgent update that must be made as soon as possible, but does not have the time to receive updates from other nodes. Accordingly, FIG. 1 shows only transmission of node update log 35-a from node docking manager 25-b to central docking manager 5, and no transmission from central docking manager 5 to node docking manager 25-b. Accordingly, the merge manager for node 21-b is not activated and is not shown.

Likewise, node 21-b is depicted as not in communication with central computer system 1. Accordingly, the docking manager for node 21-b is not activated and is not shown.

By the cycle described above, updates made by each of nodes 21-a, 21-b and 21-b are presented to central computer system 1, permitting central database 3 to be updated accordingly. In addition, each of the updates made by each of the nodes 21-a, 21-b and 21-b, as well as updates made on central computer system 1, are routed back to each of nodes 21-a, 21-b, and 21-b, thereby keeping each of partial databases 23-a, 23-b and 23-c in synchronization with each other and with central database 3.

Database Structure

The synchronization of central database 3 with node databases 23-a, 23-b and 23-c is performed using a construct called a Docking Object. A Docking Object consists of Member Tables (including one Primary Table), Visibility Rules, Visibility Events, and related Docking Objects.

A Member Table is a table of the relational database that makes up a docking object. When a docking object is propagated from central database 3 to one of node databases 23-a, 23-b or 23-c, the propagation takes the form of an insertion into each of the Member Tables associated with the particular docking object. Similarly, when a docking object is scheduled to be removed from a database, that removal consists of deleting records from the member tables associated with the docking object. For example, a docking object that represents a sales opportunity may include tables that represent the opportunity itself (e.g., named "S_OPTY"), the product whose sale is represented by the opportunity (e.g., named "S_OPTY_PROD"), the contact for the opportunity (e.g., named "S_OPTY_CONTACT"), etc. Each of these tables is said to be a member table of the "Opportunity Docking Object."

A Primary Table is a Member Table that controls whether a particular instance of a Docking Object is visible to a particular node. The Primary Table has a Primary Row-ID value that is used to identify a row of the Primary Table being updated, deleted or inserted. For example, the "Opportunity Docking Object" may have as a primary table the table S_OPTY. The row-id of that table, i.e., S_OPTY.row_id, is the Primary Row-ID for the Opportunity Docking Object.

A Visibility Rule is a criterion that determines whether a particular instance of a Docking Object is "visible" to a particular node 21. If a Docking Object is visible to a particular node, that node will receive updates for data in the Docking Object. Visibility Rules are of two types, depending on the field RULE_TYPE. A Visibility Rule with a RULE_TYPE of "R" is referred to as an SQL Rule. An SQL Rule includes a set of Structured Query Language (SQL) statements that is evaluated to determine if any data meeting the criteria specified in the SQL statements exists in the Docking Object. If so, the Docking Object is visible to the node. A Visibility Rule with a RULE_TYPE of "O" is referred to as a Docking Object Rule. A Docking Object Rule specifies another Docking Object to be queried for visibility. If the specified Docking Object is visible, then the Docking Object pointing to it is also visible.

A Related Docking Object is a Docking Object that is propagated or deleted when the Docking Object under consideration is propagated or deleted. For example, an Opportunity Docking Object may have related Docking Objects representing the sales contacts, the organizations, the products to be sold, and the activities needed to pursue the opportunity. When an Opportunity Docking Object is propagated from Central Database 3 to one of node databases 23, the related docking objects are also propagated.

FIG. 2 depicts a database schema that shows the relationship of the various components that make up a Docking Object. The schema is a meta-database, in that it does not describe the data being accessed in the database. Rather, the schema is a separate database that defines the structure of the database being accessed. That is, it is a database comprising tables that describe the relationships and data contexts of another database.

Each of the tables shown in FIG. 2 is a table in a relational database, and as such is in row-column form. Many columns represent fields that are common to all the illustrated tables. Such fields include for example, a ROW_ID to identify a particular row in the table, as well as fields to tack the date and time that a row was created and last modified, and the identity of the user who created or modified the row. In addition, each table contains fields specific to that table, and which are described in detail below.

Table S_DOBJ 61 describes the Docking Objects in an application. Table S_DOBJ 61 includes the fields OBJ_NAME and PRIMARY_TABLE_ID. Field OBJ_NAME defines the name of the Docking Object being described. Field PRIMARY_TABLE_ID is used to identify the primary table associated with this Docking Object.

Table S_DOBJ_INST 63 describes whether a particular instance of a Docking Object, described by table S_DOBJ 61, is present on a particular node's database. Table S_DOBJ_INST 63 includes the fields NODE_ID, DOBJ_ID and PR_TBL_ROW_ID. Field NODE_ID points to a particular node table 65. Field DOBJ_ID points to the Docking Object to which the Docking Object instance applies. Field PR_TBL_ROW_ID is used to select a particular row in the Primary Table of the Docking Object. This value identifies the Docking Object instance.

Table S_REL_DOBJ 67 describes the related Docking Objects of a particular Docking Object, described by table S_DOBJ 61. Table S_REL_DOBJ 67 includes the fields DOBJ_ID, REL_DOBJ_ID, and SQL_STATEMENT. Field DOBJ_ID identifies the Docking Object that owns a particular related Docking Object. Field REL_DOBJ_ID identifies the related Docking Object that is owned by the Docking Object identified by DOBJ_ID. Field SQL_STATEMENT is an SQL statement that may be executed to obtain the Primary ID value of the related Docking Object.

Table S_DOBJ_TBL 69 describes the member tables of a particular Docking Object, described by table S_DOBJ 61. Table S_DOBJ_TBL 69 includes the fields DOBJ_ID, TBL_ID, and VIS_EVENT_FLG. Field DOBJ_ID identifies the Docking Object that contains the member table described by the row. Field TBL_ID identifies the particular table in the database that is the member table described by the row. Field VIS_EVENT_FLG is a flag that indicates whether a change to this Docking Object can result in a visibility event. A value of "Y" indicates that a change can result in a visibility event; a value of "N" indicates that it cannot.

Table S_DOBJ_VIS_RULE 71 contains the visibility rules associated with a particular Docking Object. S_DOBJ_VIS_RULE 71 contains the fields DOBJ_ID, RULE_SEQUENCE, RULE_TYPE, SQL_STATEMENT and CHECK_DOBJ_ID. Field DOBJ_ID identifies the Docking Object with which a particular visibility rule is associated. Field RULE_SEQUENCE is a sequence number that indicates the sequence, relative to other visibility rules in table S_DOBJ_VIS_RULE 71, in which the particular visibility rule should be run. RULE_TYPE specifies whether the particular visibility rule is of type "R," indicating an SQL visibility rule or of type "O, " indicating a Docking Object visibility rule.

If RULE_TYPE is equal to "R," field CHECK_DOBJ_ID is not meaningful, and field SQL_STATEMENT contains an SQL statement that is evaluated using the Primary ROW-ID of the primary table associated with this Docking Object and a particular Node 21. If the SQL statement returns any records, the Docking Object is deemed to be visible to the Node 21 for which visibility is being determined.

If RULE_TYPE is equal to "O," both field CHECK_DOBJ_ID and field SQL_STATEMENT are meaningful. Field CHECK_DOBJ_ID specifies a docking object whose visibility should be determined. If the specified docking object is deemed to be visible, then the docking object associated with the visibility rule is also visible. Field SQL_STATEMENT contains a SQL statement that, when executed, returns the Row-ID of the docking object identified by CHECK_DOBJ_ID that corresponds to the docking object instance associated with the visibility rule.

Table S_APP_TBL 73 is an Application Table that describes all the tables used in a particular application. It is pointed to by table S_DOBJ_TBL 69 for each member table in a docking object, and by table S_DOBJ for the primary table in a docking object. S_APP_TBL 73 points to table S_APP_COL 75, which is an Application Column Table that describes the columns of data in a particular application. S_APP_TBL 73 points to table S_APP_COL 75 directly through a primary key and indirectly through such means as a Foreign Key Column Table 81, User Key Column Table 83, and Column Group Table 85. The relationship of an Application Table, Application Column Table, Foreign Key Column Table, User Key Column Table and Column Group Table are well known in the art and are not further described.

Update Processing

FIG. 3 depicts steps performed by an update manager 31 such as update manager 31-a, 31-b or 31-c in updating a database, such as a node database 23-a, 23-b or 23-c, responsive to user input. Execution of update manager 31 begins in step 101. In step 103, the update manager 31 accepts from the user input 33 in the form of a command requesting that the data in database 23 be altered. The request may be in the form of a request to delete a row of a table, to add a row to a table, or to change the value of a cell at a particular column of a particular row in a table. In step 105, using a well-known means, the update manager 31 applies the requested update to database 23. In step 107, the update manager 31 creates a log record describing the update and writes it to update log 35.

The contents of a log record describe the update made. Each log record indicates the node identifier of the node making the update, an identification of the table being updated, and an identification of the type of update being made, i.e., an insertion of a new 30 row, a deletion of an existing row, or an update to an existing row. For an insertion, the log record additionally includes an identifier of the row being inserted, including its primary key and the values of the other columns in the row. For a deletion, the log record identifies the primary key of the row being deleted. For an update, the log record identifies the primary key of the row being updated, the column within the row being updated, the old value of the cell at the addressed row and column, and the new value of the cell.

After writing a log record in step 107, the update processor exits for this update. The foregoing description of the update processing preferably includes additional steps not material to the present invention, for example, to assure authorization of the user to make the update, to stage and commit the write to the database to allow for rollback in the event of software or hardware failure, and the like. These steps are well-known in the art and are not described further.

An update manager 11 executing in central computer system 1 operates in an analogous manner, except that it updates central database 3 and writes its log records to central update log 11.

Docking Processing

FIG. 4 depicts steps performed by a Docking Manager 25 such as Docking Manager 25-*a,* 25-*b* or 25-*c* to transmit and/or receive one or more transaction logs. Docking Manager 25 is invoked by the user of a remote node such as node 21-*a,* 21-*b* or 21-*c,* whereby the user requests that the node dock with central computer 1 to upload an update log such as update log 35-*a* to central computer 1, to download a partial log such as partial log 17-*a,* or both. Execution of Docking Manager 25 begins in step 121. In step 123, Docking Manager 25 connects with central computer 1 under the control of Central Docking Manager 5. This connection can be any connection that enables data exchange. It is anticipated that the most common form of a connection is a telephone line used in conjunction with a modem, but other forms of data connection, such as a Local Area Network or a TCP/IP connection may also be used. Step 125 checks to see whether the user has requested that node update log 35-*a* be uploaded to the Central Computer 1. If so, execution proceeds to step 127. If not, step 127 is skipped and control is given to step 129. In step 127, Docking Manager 25 uploads its update log to central computer 1. The upload may be accomplished with any known file transfer means, such as XMODEM, ZMODEM, KERMIT, FTP, ASCII transfer, or any other method of transmitting data. In step 129, Docking Manager 25 checks to see whether the user has requested that a partial log such as partial log 17-*a* be downloaded from Central Computer 1. If so, execution proceeds to step 131. If not, step 131 is skipped and control is given to step 133. In step 131, Docking Manager 25 downloads its partial log from central computer 1. The download may be accomplished with any known file transfer means, such as XMODEM, ZMODEM, KERMIT, FTP, ASCII transfer, or any other method of transmitting data. In step 133, having completed the requested data transfer, Docking Manager 25 exits.

Merge Processing

Merge processing is performed by a processor such as node merge processor 27-*a,* 27-*b,* or 27-*c,* or central merge processor 7. The merge process serves to update its associated database with a transaction that has been entered by a user of a computer remote from the computer where merge processing is being performed. Merge processing is analogous to update processing and is similar in form to update processing as previously disclosed with reference to FIG. 3, with three differences. First, the input to a merge processor is not an update entered directly by a user, but rather is a log file that is obtained from a computer remote from the computer where the merge is executing. A second difference is that, as shown by in FIG. 1, merge processing does not produce a log when performed at a node. The function of a log on a node is to record a transaction for propagation to Central Computer system 1 and thence to other nodes as required. A transaction that is the subject of a merge in a node has been communicated to Central Computer System 1, and there is no need to re-communicate it.

A third difference is that merge processing must be capable of detecting and resolving multiple conflicting transactions. For example, assume that a field contains the value "Keith Palmer." Assume further that a user at node 27-*a* enters a transaction to update that field to "Carl Lake," and a user at node 27-*b* enters a transaction to update the same field to "Greg Emerson." Without collision detection, data among various nodes may become corrupt. When the transaction for user 27-*a* is merged, the field is updated from "Keith Palmer" to "Carl Lake." Without collision handling, when the transaction for node 27-*b* is merged, the field would be updated to "Greg Emerson," and the central database would then be out of sync with the database of node 27-*a*. Furthermore, when merge processing is performed on each of nodes 27-*a* and 27-*b,* each node will update its database with the other's transactions, leaving at least one node out of sync with the other node and with central database.

Therefore, merge processing must also have a means of detecting collisions and correcting them. In the above example, a simple way to detect and correct a collision is to compare the value in the database to the value that the merge log reflects as being the previous value in the node database. If the two values do not match, Merge processor 7 may reject the transaction and generate a corrective transaction to be sent to the node from which the conflicting transaction originated. In the above example, when the transaction for node 27-*b* was presented to merge processor 7, merge processor 7 would compare "Keith Palmer," the prior value of the field as recorded by node 27-*b* to "Carl Lake," the present value of the field as recorded in central database 3. Detecting the mismatch, merge processor 7 may then generate a transaction to change the value "Greg Emerson" to "Carl Lake," and write that transaction to update log 15. In a subsequent docking operation, that transaction would be routed back to node 27-*b* to bring its database 23-*b* in synch with the other databases.

The above is one example of a collision and a resulting corrective action. Other types of collisions include, for example, an update to a row that has previously been deleted, inserting a row that has previously been inserted, and the like. Merge processing must detect and correct each of these collisions. This may be performed using any of a number of well-known methods, and is not discussed further.

FIG. 5 depicts the steps performed by merge processor such as central merge processor 7. Although it depicts merge processor 7 writing to central database 3 and to transaction log 15, it is equally representative of a node merge processor such as node merge processor 27-a, 27-b or 27-c updating a node database 23-a, 23-b or 23-c. Merge processing begins at step 141. In step 143, merge processor 7 finds the first unprocessed transaction on received log 19. In step 147, merge processor 7 selects a transaction from received log 19. In step 149, merge processor 149 attempts to update database 3 according to the transaction selected in step 147. In step 151, merge processor 7 determines whether the database update of step 149 failed due to a collision. If so, merge processor proceeds to step 153, which generates a corrective transaction. Following the generation of the corrective transaction, the merge processor returns to step 149 and again attempts to update database 3. If no collision was detected in step 151, execution proceeds to step 157. In step 157, merge processing checks to see if it is executing on central computer 1. If so, step 155 is executed to journal the transaction to log 15. In any case, either if step 157 determines that the merge processing is being performed on a node or after step 155, execution proceeds to step 159. Step 159 checks to see if any transactions remain to be processed from log 19. If so, execution repeats from step 147, where the next transaction is selected. If not, merge processing exits in step 161.

Log Management

FIG. 6 depicts the steps to be performed by log manager 9 to prepare a partial transaction log such as partial transaction log 17-a, 17-b, or 17-c. The procedure depicted in FIG. 6 is executed for each node available to dock with central computer system 1. Log manager 9 begins execution in step 171. In step 173, Log Manager 9 finds the first unprocessed transaction for the node whose partial transaction log is being prepared. In step 175, log manager 9 selects a transaction for processing. In step 177, log manager 9 checks to see whether the selected transaction originated on the same node for which processing is being performed. If so, there is no need to route the transaction back to the node, and control proceeds to step 179. Step 179 checks to see whether there are any transactions remaining to be processed. If so, control is given again to step 175. If not, control passes to step 189, which records the last transaction that was processed for this node, and then exits at step 191. If the transaction originates in other than the same node as the node for which processing is being performed, control is given to step 181. Step 181 calls a visibility calculator to determine whether the selected transaction is visible to the node being processed. The Visibility calculator routine is described in detail further herein. In step 183, merge processor 9 checks to see whether the visibility calculator determined that the transaction is visible. If it is not visible, control is passed to step 179, which performs as disclosed above. If the transaction is visible, control is passed to step 185. Step 185 writes a record for this transaction to the partial transaction log for the node being processed, for example, partial transaction log 17-a for node 21-a. In step 187, the log manager 9 records the last transaction that was processed for this node, and then passes control to step 179, which determines whether to select additional transactions or exit, as disclosed above.

Visibility Calculation

FIG. 7 depicts a flowchart describing the process a visibility calculator for calculating visibility for a docking object as invoked by step 181 of log manager 9. The visibility calculator is called with the node-id of the node for which visibility is being calculated, the docking object for which the visibility is being calculated, and the row-id of the docking object whose visibility id being calculated. The visibility calculator uses this information, in conjunction with information obtained from meta-data stored in the schema depicted in FIG. 2, to determine whether a particular transaction that updates a particular row of a particular docking object is visible to a particular node.

The Visibility calculator begins execution at step 201. In step 203, the visibility calculator makes a default finding that the transaction is not visible. Therefore, unless the visibility calculator determines that a transaction is visible, it will exit with a finding of no visibility. In step 205, the visibility calculator selects the first visibility rule associated with the docking object. This is done by finding the table S_DOBJ_VIS_RULE 71 associated with the current Docking Object as pointed to by table S_DOBJ 61. In step 205, the visibility calculator selects the row of table S_DOBJ_VIS_RULE 71 with the lowest value for field RULE_SEQUENCE.

In step 207, the Visibility Calculator checks the field RULE_TYPE for a value of "R." The value of "R" indicates that the rule is a SQL visibility rule. If so, the Visibility Calculator proceeds to step 209. In step 209 the Visibility Calculator obtains a SQL statement from field SQL_STATEMENT and executes it An example of such an SQL statement might be:

SELECT 'X' FROM S_OPTY_EMP
WHERE OPTY_ID=:PrimaryRowId
 AND EMP_ID =:NodeId;

This SQL statement causes a query to be made of application table S_OPTY_EMP. The query selects any records meeting two criteria. First, the records selected must have a field OPTY_ID, which is a row id or key, equal to the Primary Row-ID of the Docking Object whose visibility is being determined. Second, the records selected must have a field EMP_ID, which may be for example, an identifier of a particular employee, equal to the NodeId of the node for whom visibility is being determined. In ordinary language, this SQL statement will return records only if a row is found in a table that matches employees to opportunities, where the opportunity is equal to the one being updated, and the employee to whom the opportunity is assigned is the operator of the node.

This is a simplistic example, provided for maximum comprehension. More complex SQL statements are possible. For example, the rule:

SELECT 'X' FROM
 &Table_Owner.S_ACCT_POSTN ap
 &Table_Owner.S_EMP_POSTN ep
 WHERE ap.POSITION_ID=ep.POSITION_ID
  AND ep.EMP_ID=:NodeId;

This rule queries the tables S_ACCT_POSTN (which relates a particular account with a particular position in the organization that is responsible for the account) and S_EMP_POSTN (which relates what employee corresponds to a particular position). The condition "ap.POSITION_ID=ep.POSITION_ID" requires finding a row in the account-to-position table that has the same position as a row in the employee-to-position table. The condition "ep.EMP_ID=:NodeId" further requires that the selected row in the employee-to-position table also have an Employee ID equal to the ID of the user of the Node for which visibility is being determined. In ordinary language, this condition allows visibility if the employee occupies the position that has responsibility for the account in the docking object being updated.

There is no particular limit to the complexity of the conditions in the SQL statement used to evaluate visibility. Particular implementations of SQL may impose limitations, and resource considerations may make it desirable to use less complex statements, but these limitations are not inherent in the invention.

Step 211 evaluates whether the execution of SQL_STATEMENT in step 209 returned any records. If records were returned, this indicates that the Node for which visibility is being checked has visibility to the docking object being processed. Accordingly, if records are returned, the Visibility Calculator proceeds to step 213. In step 213, the transaction is marked visible. Because no further rules need to be evaluated to determine visibility, the visibility calculator proceeds to step 228. Step 228 synchronizes the databases by determining whether the calculated visibility requires the insertion or deletion of a docking object into a particular node's partially replicated database. This may occur, for example, if a node is determined to have visibility to a docking object due to a change to a related docking object. For example, an owner of a node may be assigned to a particular activity that is related to a particular sales opportunity. As a result, the node should be provided with a copy of the object representing the sales opportunity.

FIG. 8 depicts the steps performed to synchronize a partially replicated database in response to a change in data visibility. Execution begins in step 241. In step 243, the Visibility Calculator references the visibility just calculated for a docking object. If the Docking Object is visible, execution proceeds to step 245. Step 245 references the S_DOBJ_INST table, to verify that a row exists for the Docking Object for the current node. If a row exists, this indicates that the node in question already has a copy of the referenced Docking Object, and the routine proceeds to step 255, where it exits. If, however, no row exists for the Docking Object at the node being processes, this indicates that the node in question does not have a copy of the Docking Object on its partially replicated database. The routine then proceeds to step 247, where a transaction is generated to direct the node to insert the Docking Object into its partially replicated database.

If step 243 determines that the Docking Object is not visible, execution proceeds to step 249. Step 249 references the S_DOBJ_INST table, to verify that no row exists for the Docking Object for the current node. If step 243 determines that no row exists in the S_DOBJ_INST table for the current docking object for the current row, this indicates that the node in question does not have a copy of the referenced Docking Object, and the routine proceeds to step 255, where it exits. If, however, a row exists for the Docking Object at the node being processed, this indicates that the node in question does have a copy of the Docking Object on its partially replicated database. The routine then proceeds to step 251, where a transaction is generated to direct the node to delete the Docking Object from its partially replicated database.

Referring again to FIG. 7, following the data synchronization routine of step 228, the Visibility Calculator proceeds to step 229, where it exits. Referring to FIG. 6, as previously described, the resulting finding of visibility is available to be checked by the log manager in step 183 to determine to write the transaction.

Referring again to FIG. 7, if step 211 determines that no records were returned by the execution of the SQL statement in step 209, execution proceeds with step 215. Step 215 checks to see whether there are any remaining visibility rules to be assessed. If not, the visibility calculator proceeds to step 228 to synchronize the database, and then to step 229, where it exits. In this case, the default mark of no visibility that was set in step 203 remains set. This value will also be used by the log manager as shown in FIG. 6, step 183, to determine not to write the transaction.

Referring again to FIG. 7, if rules remain to be assessed, control proceeds to step 217, which selects the next rule to be processed. Control is then given again to step 207 to begin processing the new rule.

The preceding text provided a description of the processing or SQL visibility rule; that is, visibility rules of type "R." If step 207 determines that the visibility rule is not of type "R," the visibility rule is of type "O." Type "O" indicates a docking-object visibility rule. In such a case, the docking object being processed will be considered to be visible if it is related to a particular related docking object that is visible. If field RULE_TYPE is not equal to "R," then. execution proceeds to step 221. Step 221 determines the related Docking Object whose visibility must be determined to determine whether the current docking object is visible. The related Docking Object identifier is obtained from field CHECK_DOBJ_ID in table S_DOBJ_VIS_RULE 71. In step 223, the Visibility Calculator determines which row in the related Docking Object must be queried for visibility. In order to determine this, the Visibility Calculator obtains a predetermined SQL statement from the field SQL_STATEMENT and executes it. The SQL statement is a query that select one or more rows of the Docking Object that, for example, correspond to the docking object for which the Visibility Calculator was invoked.

For example, assume that it is desired to indicate that a record for a sales opportunity should be visible if the Node has visibility to any sales quote made for that sales opportunity. This may be accomplished using the following SQL statement:

SELECT"_ID" FROM
&Table_Owner.S_DOC_QUOTE
WHERE OPTY_ID=:Primary RowId

This SQL statement accesses a table S_DOC_QUOTE that contains all sales quotes. The WHERE clause specifies retrieval of all rows where the Opportunity ID of the row is equal to the Row-ID of the opportunity for which visibility is being calculated. The Visibility manager retrieves the specified Row-Ids, thereby identifying the rows of the S_DOC_QUOTE table whose visibility must checked.

Having determined the a related docking object and the row-ID of that related docking object upon whose visibility the visibility of the current docking object depends, the Visibility Calculator proceeds to step 225. In step 225, the Visibility Calculator recursively invokes itself to determine visibility of the related docking object. The recursively invoked Visibility Calculator operates in the same manner as the Visibility Calculator as called from the Log Manager 9, including the capability to further recursively invoke itself. When the recursive call concludes, it returns a visibility indicator for the related Docking Object, and control proceeds to step 227. In step 227, the Visibility calculator determines whether the related Docking Object was determined to have been visible. If so, the Visibility Calculator proceeds to step 213 to mark the originally current Docking Object as visible, and then to step 228 to synchronize the database and then to step 229 to exit. If the related Docking Object was not determined to be visible, control proceeds to step 215 to determine whether additional visibility rules remain to be assessed.

The Visibility Calculator, in conjunction with the Log Manager is therefore able to determine what subset of update transaction data is required to be routed to any particular node. This operation serves to reduce the transmission of unneeded data from the Central Computer 1 to the various nodes such as nodes 21-a, 21-b and 21-b that utilize partially replicated databases, and to reduce the system resources such as disk space needed to store, and the CPU time needed to process, what would otherwise be required to maintain a fully replicated database on each remote node.

The operation of the log manager 9 in conjunction with the Visibility Calculator herein described will be apparent from reference to the description and to the drawings. However, as a further aid in the description of these facilities, a pseudocode representation of these facilities is hereto attached as an Appendix.

Multiple-User Docking Clients

The present invention may be enhanced by adding support for multi-user docking clients. This capability extends the docking architecture to permit replication of database information from the master database server to a variety of geographically dispersed workgroup servers (also called agency database servers). This capability allows multiple users to connect to these agency database servers. Mobile users need to synchronize their local databases against the master database server.

Multi-user docking clients provide the basis of a single, integrated, logical database. FIG. 9 depicts the logical database configured to support multi-user docking clients. A single master database 3 at headquarters routes transactions to mobile clients and multi-user docking clients. Zero or more connected users such as connected user 301 can access the master database 3 directly. Single-user mobile databases such as mobile database 23-a on the mobile clients such as mobile client 21-a exchange data with the master database 3. A single mobile user accesses the single-user database 23-a. Multiple multi-user workgroup databases such as workgroup database 305 periodically exchange data with the master database 3. Multiple workgroup users 310 can access the workgroup database 305 directly.

The master database 3 can access the multiple connected users such as connected user 301. The master database 3 can exchange data directly with single-user mobile databases such as mobile database 23-a on the mobile clients such as mobile client 21. The master database 3 periodically exchanges data with multiple multi-user workgroup databases such as workgroup database 305. Changes and data exchange may be sent from the master database server 3 directly to the agency server 315 and to the workgroup server clients, such as workgroup users 310.

In another aspect of the invention workgroup connected clients (330-a) that are directly connected to the workgroup server (315) can create transactions directly on the workgroup server (315). These transactions created by workgroup connected clients are sent directly to the master database server (4) and are applied at the master database server (4). These transactions created by workgroup connected clients are also routed to workgroup user clients (310). In this aspect of the invention, the aspect is a method of collecting, storing, and retrieving data in a database management system having a master database server (4), at least one workgroup server (315), and one or more workgroup connected clients (330-a). In this embodiment of the invention the workgroup server (315) is directly connected to the workgroup connected clients (330-a). The method of this embodiment of our invention includes creating a transaction in a local database resident on one of the workgroup connected clients (330-a), entering the transaction into a transaction log resident on the workgroup connected client (330-a), and creating a transaction file corresponding to the transaction in an outbox of the workgroup user client (330-a). In this embodiment of our invention, the next step is copying the transaction file to an inbox identified to the workgroup connected client (330-a) and updating the transaction file into a workgroup database (305) resident on the workgroup server (315), where the workgroup database (305) includes a transaction log. The transactions are directly entered into the transaction log in the workgroup server (315).

Multi-user docking clients comprise an agency server (315) (or simply, "agency"), running a workgroup database 305, and one or more workgroup users (310) connected to the server via a LAN or other connection. Agency server (315) may be a Windows/NT server or other server. Multi-user docking clients behave in the same way as single-user mobile clients. In addition, multi-user docking clients store data for one or many users; allow multiple users to access and change data on the workgroup database simultaneously; permit users to execute server-side programs against the workgroup; and execute a periodic docking program to exchange data with the master database at predefined times or intervals.

In this aspect of the invention, the database is configured to support a plurality of users in a single docking entity. More particularly, one aspect of the invention is a method of collecting, storing, and retrieving data in a data base management system having a master database server (4), at least one workgroup server (315), and a plurality of workgroup user clients (310). In this embodiment of the invention the workgroup server (315) is interposed between the master database server (4) and said workgroup user clients (310). The method of this embodiment of our invention includes creating a transaction in a local database resident on one of the workgroup user clients (310), entering the transaction into a transaction log resident on the workgroup user client (310), and creating a transaction file corresponding to the transaction in an outbox of the workgroup user client (310). In this embodiment of our invention, the next step is copying the transaction file to an inbox identified to the workgroup user client (310) and updating the transaction file into a workgroup database (305) resident on the workgroup server (315), where the workgroup database (305) includes a transaction log. The next step in the method of our invention includes reading the workgroup database (305) transaction log, skipping those transactions which originate at the master database server (4) so as to avoid looping, and creating data files corresponding to the entries in the transaction log. These entries are copied to an inbox on the master database server (4) which corresponds to entries on the workgroup server (315). These entries are used to update the transactions into a master database (3) on the master database server (4).

A still further embodiment of this aspect of the invention is its incorporation into an article of manufacture, that is, a disk, a tape, or the like. The article is a computer usable, i.e., readable, medium having computer readable program code for collecting, storing, and retrieving data in a data base management system. The database management is one, as described above, having a master database server (4), an application server (303 ), at least one workgroup server (315), and a plurality of workgroup user clients (310), where the application server (303) and the workgroup server (315) are interposed between the master database server (4) and the workgroup user clients (310). The computer readable program in the article of manufacture includes computer readable program code for causing a computer to create a transaction in a local database resident on one or more of the individual workgroup user clients (310), and entering the transaction into a transaction log resident on one of the workgroup user clients (310), that is, the workgroup user client (310) where the transaction originated, and creating a transaction file corresponding to the transaction in an outbox of the workgroup user client (310). In this embodiment of our invention the computer readable program code causing the computer to effect copying the transaction file to an inbox identified to the workgroup user client (310) and updating the transaction file into a workgroup database (305) resident on the workgroup server (315). The workgroup database (305) includes a transaction log. Finally, the computer readable program code causes the computer to effect reading the workgroup database (305) transaction log, skipping those transactions which originate at the master database server (4), to avoid looping, creating data files corresponding to the entries therein, and copying the data files corresponding to transactions originating at the workgroup user client (310) to an inbox on the master database server (4) corresponding to the workgroup server (315). Next, the transactions are updated into a master database (3) on the master database server (4).

A still further aspect of our invention is a program storage device readable by a machine, tangibly embodying a program of instructions executable by a machine to perform method steps for collecting, storing, and retrieving data, that is, in a data base management system having a master database server (4), an application server (303), at least one workgroup server (315), and a plurality of workgroup user clients (310), where the application server (303) and the workgroup server (315) are interposed between the master database server (4) and said workgroup user clients (310). In this embodiment the code causes the database management system resident on a workgroup client to create a transaction in a local database resident on the workgroup user clients (310), enter the transaction into a transaction log resident on the workgroup user client (310), and create a transaction file corresponding thereto in an outbox of said workgroup user client (310). Next, the transaction file is caused to be copied to an inbox identified to the workgroup user client (310) and the transaction file is updated into a workgroup database (305) resident on the workgroup server (315). To be noted is that the workgroup database (305) includes a transaction log. Next, the software reads the workgroup database (305) transaction log, skipping those transactions which originated at the master database server (4), that is, to avoid looping, creating data files corresponding to the entries in the transaction log, and copying data files corresponding to transactions originating at the workgroup user client (310) to an inbox on the master database server (4) corresponding to the workgroup server (315), and updating the transactions into a master database (3) on the master database server (4).

The following flow descriptions describe the process and flow of transactions and correspondence among the various components.

In order to process a transaction from the agency to the central database at the headquarters node, the periodic docker reads the transaction log in the agency database and creates a dx file in the agency node's outbox. The periodic docker checks the originating node of the transaction entry read from the transaction log and skips those which originate at the headquarters node, or the parent node of the agency node, in configurations having multiple agency levels. This is required because the periodic docker turns on transaction logging when calling datamerge to merge the changes from the HQ node. Transaction logging is needed for the log manager to route those transactions that must be routed to client nodes down below, but not routed back to the headquarters node. Otherwise, an infinite loop could occur. The periodic docker updates the docking status table. This is required so that the log manager deletes only those records from the transaction log table that have been read by both the periodic docker and the log manager. The dx file is copied to agency node's inbox on HQ app server, and the server manager merges the transaction into the headquarters database. The server manager logs the transaction in the headquarters database, setting the SRC_NODE_NUM field to indicate the agency node's node id.

In order to process a transaction from the central database at the headquarters node to the agency, a transaction is created in on the headquarters database. The transaction is entered into the transaction log table at the headquarters node. Log manager on the HQ node determines whether the agency node has visibility to this transaction. If so, Log Manager writes a dx file into the outbox of the agency node on the HQ node. The periodic docker on the agency server reads the transaction from its outbox on the HQ node, and copies it down to the inbox on the agency node. The periodic docker calls datamerge to merge the transaction into the agency database. The transaction is logged by the periodic docker. The periodic docker must enable transaction logging when calling datamerge so that the log manager can route these transactions to mobile clients. The SRC_NODE_NUM field is set to HQ=s node id.

Multi-Level Docking Clients

In order to process a transaction from a client to an agency, a transaction is first created on the client database. The transaction is then entered into a transaction log on the client database. The client docks with the master database node. The client-side transaction log entry is read by the docking manager and a dx file is created in a client node outbox. The dx file is copied to the clients in-box on the agency server. The server manager on the agency application server reads the dx file and merges the transaction described therein into the agency database, using the merge processing previously disclosed. The server manager then logs the transaction in the agency database, setting the SRC_NODE_NUM to identify the node id of the originating client.

In addition to items described in the previous section, other mobile users, called workgroup user clients (310), can synchronize their local databases against the agency database server (305). Workgroup connected clients (330-a) exchange data with the workgroup server (315). A single mobile user (21-a) can access a single-user database (23-a).

In order to process a transaction from an agency to a client, the log manager executing on the agency reads the transaction from the transaction log, checks whether that transaction is visible to the mobile client. If so, the log manager writes the corresponding dx files into the client node's outbox on the agency node. Subsequently, the client node docks with agency node. The docking manager reads the dx files from its outbox and copies them down to the inbox on the client node. The docking manager then calls datamerge to merge these transaction records into the client database. No transaction is logged.

FIG. 10 depicts a database diagram describing the database design to support multi-user docking clients. Node table 65 (named S_NODE) has a one-to-many relationship to node relationship table 360 (named S_NODE_REL), node employees table 365 (named S_NODE_EMP), dock object instance table 370 (named S_DOCK_INST, equivalent to S_DOBJ_INST table 63) and dock status table 375. Node employees table 365 has a many-to-one relationship with employees table 380 (named S_EMPLOYEE)

Node employees table 365 serves as an intersection table between node table 65 and employees table 380. It includes the following fields.

| Column | Type | Constraints |
|---|---|---|
| ROW_ID | VARCHAR2(15) | Primary not null |
| CREATED | DATETIME | not null |
| CREATED_BY | VARCHAR2(15) | not null |
| LAST_UPD | DATETIME | not null |
| LAST_UPD_BY | VARCHAR2(15) | not null |
| MODIFICATION_NUM | NUMBER | not null |
| CONFLICT_ID | VARCHAR2(15) | not null |
| NODE_ID | VARCHAR2(15) | Unique$_1$ ref(Node) not null |
| EMP_ID | VARCHAR2(15) | Unique$_2$ ref(Emp) not null |

Node employees table 365 is indexed as follows:
  unique index S_NODE_EMP_P1 on S_NODE_EMP (ROW_ID)
  unique index S_NODE_EMP_U1 on S_NODE_EMP (
    NODE_ID, EMP_ID
  )
  non-unique index S_NODE_EMP_F1 on S_NODE_EMP (EMP_ID)

Node table 65 comprises the following updated fields to support multi-user docking clients.

| Column | Type | Constraints |
|---|---|---|
| ROW_ID | VARCHAR2(15) | Primary not null |
| CREATED | DATETIME | not null |
| CREATED_BY | VARCHAR2(15) | not null |
| LAST_UPD | DATETIME | not null |
| LAST_UPD_BY | VARCHAR2(15) | not null |
| MODIFICATION_NUM | NUMBER | not null |
| CONFLICT_ID | VARCHAR2(15) | not null |
| NAME | VARCHAR2(50) | not null |
| DESC_TEXT | VARCHAR2(255) | |
| EMP_ID | VARCHAR2(15) | |
| HW_SERIAL_NUM | VARCHAR2(50) | |
| HW_MANUFACTURER | VARCHAR2(50) | |
| EFF_END_DATE | DATE | |
| CUR_NODE_PREFIX | VARCHAR2(15) | |
| PAR_NODE_ID | VARCHAR2(15) | |

Node table 65 is indexed as follows:
  unique index S_NODE_P1 on S_NODE (ROW_ID)
  unique index S_NODE_U1 on S_NODE (
    NAME, CONFLICT_ID
  )
  unique index S_NODE_U2 on S_NODE (
    EMP_ID, CONFLICT_ID
  )
  non-unique index S_NODE_F1 on S_NODE (PAR_NODE_ID)

Node relationship table 360 comprises the following fields.

| Column | Type | Constraints |
|---|---|---|
| ROW_ID | VARCHAR2(15) | Primary not null |
| CREATED | DATETIME | not null |
| CREATED_BY | VARCHAR2(15) | not null |
| LAST_UPD | DATETIME | not null |
| LAST_UPD_BY | VARCHAR2(15) | not null |
| MODIFICATION_NUM | NUMBER | not null |
| CONFLICT_ID | VARCHAR2(15) | not null |
| NODE_ID | VARCHAR2(15) | not null |
| SUB_NODE_ID | VARCHAR2(15) | not null |
| RELATION_TYPE | VARCHAR2(30) | not null |

Node relationship table 360 is indexed as follows:
  unique index S_NODE_REL_P1 on S_NODE_REL (ROW_ID)
  unique index S_NODE_REL_U1 on S_NODE_REL (NODE_ID,SUB_NODE_ID,RELATION_TYPE, CONFLICT_ID)
  non-unique index S_NODE_REL_F2 on S_NODE_REL (SUB_NODE_ID)

CONCLUSION

Various modifications to these embodiments will be readily apparent to those skilled in the art, and the generic principles defined herein may be applied to other embodiments without the use of inventive faculty. Thus, the present invention is not intended to be limited to the embodiments shown herein, but is to be accorded the widest scope consistent with the principles and novel features disclosed herein.

All publications and patent applications mentioned in this specification are herein incorporated by reference to the same extent as if each individual publication or patent application was specifically and individually indicated to be incorporated by reference.

The invention now being filly described, it will be apparent to one of ordinary skill in the art that many changes and modifications can be made thereto without departing therefrom.

APPENDIX

Writing User Transaction Log File for a Given Laptop Node

This program will be called by a server-side process that processes transaction log entries for all Laptop Nodes. For each Laptop Node, the calling process building the UserTrxnLogFileName and calling Program 1.

Input Parameters
  LaptopNodeId—node_id of the destination laptop
  UserTxnLogFileName—full path of the file where txns will be written
  MaxBatchTxns—number of txns between commits and updates to the
  S_DOCK_STATUS table
  MaxTxns—number of txns to process in this session. Use this parameter to limit processing.

Main Algorithm
Check parameters
IF (MaxTxns<1||MaxBatchTxns<1) THEN
  Invalid Parameter
END IF
Get last LOG_EXTRACT number for the Laptop from
  S_DOCK_STATUS
last_txn_commit_number=UTLDStatGetLogNum
  (LaptopNodeId);
Initialize Variables
NumTxns=0; Total number of txns processed
NumBatchTxns=0; Total number of txns written in the
  current batch
Read Docking Object and Table definitions into memory
  structures
StartDictApi ();
Open the User Log Txn file
Open User Log Txn file
Select and process new txns in S_DOCK_
  TRANSACTION_LOG
where txn_commit_number>last_txn_commit_number
FOR each new txn LOOP
Stop processing if reach MaxTxns
IF NumTxns=MaxTxns THEN
  break;
END IF;
Prevent circular txns. Do not send the txn back to the
  originating laptop
IF txn.OriginNodeId=LaptopNodeId THEN
  Goto next transaction
END IF;
Process all other types of transactions
This is the visibility calculator!
This routine also processes implicit visibility events
Later: Data Merge can call this function to check whether a
  txn is
  still visible when merging txns into a laptop or server
    database.
CheckVisibility (LaptopNodeId, LogRecordType,
  TableName, TransRowId);
IF txn is visible THEN
  Write transactions to UserTxnLog file depending on the
  type of LogRecordType.
  Write the txn to the user log file
  ++NumBatchTxns
END IF;
Finished processing the txn
Commit (if needed)
IF NumBatchTxns=MaxBatchTxns THEN
  Assume that separate process comes around and deletes
    Txns in S_DOCK_TRANSACTION_LOG that have
      been processed
    for all nodes. So, no need to delete the txns from the log.
  Update last LOG_EXTRACT number for Laptop in
    S_DOCK_STATUS
  Commit;
  NumBatchTxns=0
END IF;
++NumTxns
End Loop;/* Each transaction in the Txn Log table */
Commit
Update last LOG_EXTRACT number for Laptop in
  S_DOCK_STATUS
Commit;
Close log file (if needed)
IF UserTxnLogFileP !=NULL THEN
  Close File;
END IF;
StopDictApi ();
Check Visibility Routines
Check if a record in the txn log is visible to a LaptopNodeId
BOOL CheckVisibility (LaptopNodeId, LogRecordType,
  TableName, TransRowId)
{
  SQLStatements routed based on the destination list
  IF LogRecordType in ('SQLStatement') THEN
    IF Laptop Node in destination list THEN
      return TRUE;
    END IF;
  Shadow and Multi Record LogRecordTypes are routed to
    all nodes
  No visibility events with these LogRecordTypes.
  ELSIF LogRecordType in ('ShadowOperation',
    'MultiRecordDelete',
    'MultiRecordUpdate') THEN
  return TRUE;
  Simple Deletes need more processing
  ELSIF LogRecordType in ('Simple Delete') THEN
  IF (table.visibility in ('Enterprise', 'Limited')) THEN
      return TRUE;
    END IF;
  Simple Inserts and Simple Updates need more processing
  CheckTxnVisibility() also processes implicit visibility
    events
  ELSIF LogRecordType in ('Simple Insert', 'Simple
    Update') THEN
    IF (table.visibility='Enterprise') THEN
      return TRUE;
    ELSIF table.visibility='Limited' THEN
      IF CheckTxnVisibility (LaptopNodeId, Table,
        RowId) THEN
        return TRUE;
      END IF;
    END IF;
  END IF;
}
Check if a record in the txn log is visible to a LaptopNodeId
static BOOL CheckTxnVisibility (LaptopNodeId, Table,
  RowId)
{
  BOOL bVisible=FALSE;
  Find the Table in the Dictionary;
  IF Table not found THEN
    Error: Table not defined
  END IF;
  FOR all docking objects that the table belongs to LOOP
    Generate SQL to get PrimaryId values of the Docking
      Object
    GeneratePrimaryIdSQL (Table, RowId,
      DockingObject);
    FOR each PrimaryId value retrieved LOOP
      CheckObjectVisibility (LaptopNodeId,
        PrimaryTable, PrimaryRowId)
      IF object is visible THEN
        Because CheckObjectVisibility() also processes
          implicit
          visibility events, we must loop through ALL
            docking objects

```
even if we already know that the Txn is visible.
    Exception: if the table has VIS_event_FLG='N'
    then we can return immediately.
    IF Table.visibilityEventFLG='N' THEN
        return TRUE;
    ELSE
        bVisible=TRUE;
        END IF;
    END IF;
END LOOP;
END LOOP;
}
return bVisible;
Check if an instance of a docking object is visible to the
    laptop user.
Also processes implicit visibility events!
BOOL CheckObjectVisibility (LaptopNodeId,
    DockingObjectName, PrimaryRowId)
{
    FOR each visibility rule for the Docking Object LOOP
        IF RuleType=RuleSQL THEN
            Run the select SQL statement using PrimaryRowId;
            IF any rows returned THEN
                row is visible
                Process an implicit Download Object
                DownloadObject nstance (LaptopNodeId,
                    PrimaryTableName, PrimaryRowId);
                return TRUE;
            END IF;
        ELSIF RuleType=CheckDockingObject THEN
            Run the ParameterSQL using PrimaryRowId to get
                newPrimaryRowId
            FOR each record retrieved by ParameterSQL LOOP
                RECURSIVE!
                CheckObjectVisibility (LaptopNodeId,
                    CheckDockingObjectName,
                    newPrimaryRowId);
                IF rc=TRUE THEN
                    Process an implicit Download Object
                    DownloadObjectInstance (LaptopNodeId,
                        PrimaryTableName,
    PrimaryRowId);
                    return TRUE;
                END IF;
            END LOOP;
        END IF;
END LOOP;
Object is not visible.
Process an implicit Remove Object
RemoveObjectInstance       (LaptopNodeId,
    PrimaryTableName, PrimaryRowId);
return FALSE;
}
Generate SQL Statement to Get PrimaryId
Generate the SELECT SQL statement to get the PrimaryId
    value of
the docking object for the given MemberTable
SQL statement looks like:
    SELECT tp.<row_id>
        FROM <table_owner>.<Table>t1,
            <table_owner>.<PKTable>t2,
            ... one or more intermediate tables between the table
                and the PrimaryTable
            <table_owner>.<PKTable>tN
                <table_owner>.<PrimaryTable>tp
        WHERE t1.ROW_ID=:row_id /* row_id in transac-
            tion log */
        /* join to PK table t2*/
        AND t1.<FKColumn>=t2.<PKColumn>
        AND <t1 FKCondition>
        /* any number of joins until reach the table that joins
            to the PrimaryTable */
        /* join from t2 to tN */
        AND t2.<FKColumn>=tN.<PKColumn>
        AND <t2 FKCondition>
            /* join to the PrimaryTable */
            AND tN.<FKColumn>=tp.<PKColumn>
            AND <tN FKCondition>
Note that there may be one or more paths from the Member
    Table
to the Primary Table. We need to generate a SQL select
    statement
for each of the paths and UNION the statements together.
This function assumes that there are no loops in the defini-
    tion.
These SQL statement do not change for each Table in a
    Docking Object,
so we can calculate them one and store them in memory.
struct
{
    CHAR* selectList;
    CHAR* fromClause;
    CHAR* whereClause;
    UINT numTables; /* also the number of joint to reach the
        Primary Table */
} GenStmt;
GeneratePrimaryIdSQL (Table, DockingObject)
{
    /* there may be more than one SQL statement, so we have
        a dynamic array of SQL statements. Each element in
        the array is a path from the Table to the Primary Table*/
    DynArrId GenStmtArr;
    GenStmt newGenStmt;
    CHAR* sq1Stmt;
    DynArrCreate (GenStmtArr);
    Create the first element and initialize
    newGenStmt=malloc();
    newGenStmt.numTables=1;
    newGenStmt.selectList="SELECT row_id";
    newGenStmt.fromClause="FROM <Table>t1";
    newGenStnt.whereClause="WHERE t1.ROW_ID=:row
        _id";
    DynArrAppend (GenStmtArr, &newGenStmt);
        /* Recursively follow FKs to the PrimaryTable */ Build
            the select, from and where clause simultaneously */
    AddPKTable (Table, DockingObject, GenStmtArr, 0);
    Union all the paths together
    numStmts=DynArrSize (GenStmtArr);
    FOR all elements in the array LOOP
        tmpSq1Stmt=GenStmtArr[j].selectList|| GenStmtArr[j]
            .fromClause||
    GenStmtArr[j].whereClause;
        sq1Stmt=sq1Stmt || 'UNION' ||tmpSq1Stmt;
    END LOOP;
    DynArrDestroy (GenStmtArr);
        IF sq1Stmt=NULL THEN
            Error: no path from Table to Primary Table.
        END IF;
}
Recursively follow all FKs to the Primary Table
AddPKTable (Table, DockingObject, GenStmt,
    InputStmtNum)
```

```
{
    UINT numFKS=0;
    UINT StmtNum;
    GenStmt newGenStmt; p1 FOR all FKs for the table
        LOOP
        IF PKTable is a Member Table of the Docking Object
            THEN
            If there's more than one FK, then there is more than
                one path
                out of the current table.
            Copy the SQL stmt to a new DynArrElmt to create
                a new path
        IF numFKs>0 THEN
            Create a new element and copy from GenStmt
                [InputStmtNum]
            newGenStmt=malloc();
            newGenStmt.numTables=GenStmt[InputStmtNum]
                .numTables;
            newGenStmt.selectList=GenStmt[InputStmtNum]
                .selectList;
            newGenStmt.fromClause=GenStmt[InputStmtNum]
                .fromClause;
            newGenStmt.whereClause=GenStmt
                [InputStmtNum].whereClause;
            DynArrAppend (GenStmtArr, &newGenStmt);
            StmtNum=DynArrSize (GenStmtArr);
            Put a check here for infinite loops
            IF StmtNum =20 THEN
                Error: Probably got an Infinite loop?
            END IF;
        ELSE
            StmtNum=InputStmtNum;
        END IF;
        Append the new PKTable to the fromClause and
            whereClause
        GenStmt[StmtNum].fromClause=
            GenStmt[StmtNum].fromClause     ||",/n
            <Table>t<numTables +1>";
        GenStmt[StmtNum].whereClause=
            GenStmt[StmtNum].whereclause ||
            "AND  t<numTables>.<FKColumn>=t<numTables+
            1>.<PKColumn>"
||
            "AND<FKCondition for Table if any>";
        ++GenStmt.numTables;
    PKTable is the Primary Table then Done.
    IF PKTable=PrimaryTable THEN
        RETURN;
    ELSE
        AddPKTable (PKTable, DockingObject, GenStmt,
            StmtNum);
    END IF;
        Only count FKs to other member tables in the same
            Docking Object
        ++numFKs;
    END IF;
END LOOP;
    RETURN;
}
Process Visibility Events
Download an Object Instance to a Laptop
This function also downloads all Related Docking Object
    instances.
BOOL DownloadObject nstance (LaptopNodeId,
    ObjectName, PrimaryRowId)
{
Check if the object instance is already downloaded to the
    laptop
Find the object instance in the S_DOBJ_INST table
IF exists on laptop THEN
    return TRUE;
END IF;
Register object instance in S_DOBJ_INST table
Write Download Object records to the Txn Log
FOR each member table of the docking object LOOP
    Generate SQL select statement to download records
    Write each retrieved record to the User Txn Log file
END LOOP;
Download records for Parent Object instances
FOR each RelatedDockingObject LOOP
    Run ParameterSQL to get newPrimaryId of RelatedDock-
        ingObjects
    FOR each newPrimaryId retrieved LOOP
        Check if the instance of the object is visible to the
            laptop user
        CheckObjectVisibility (LaptopNodeId, ObjectName,
            PrimaryRowId)
        IF visible THEN
            DownloadObjectInstance (LaptopNodeId,
                RelatedDockingObject, newPrimaryRowId);
        END IF;
    END LOOP;
END LOOP;
    return TRUE;
}
Remove an Object Instance to a Laptop
This function also removes all Related Docking Object
    instances.
BOOL RemoveObject Instance (LaptopNodeId,
    ObjectName, PrimaryRowId)
{
Check if the object instance is already downloaded to the
    laptop
Find the object instance in the S_DOBJ_INST table
IF does not exist on laptop THEN
    return TRUE;
END IF;
Delete the object instance from S_DOBJ_INST table
Write Remove Object records to the Txn Log
FOR each member table of the docking object LOOP
    Generate SQL select statement to get records to delete
    Write each retrieved record to the User Txn Log file
END LOOP;
Remove for Parent Object instances
FOR each RelatedDockingObject LOOP
    Run ParameterSQL to get newPrimaryId of RelatedDock-
        ingObjects
    FOR each newprimaryId retrieved LOOP
        Check if the instance of the object is visible to the
            laptop user
        CheckObjectVisibility (LaptopNodeId, ObjectName,
            PrimaryRowId)
        IF not visible THEN
            RemoveObjectInstance (LaptopNodeId,
                RelatedDockingObject, newPrimaryRowId);
        END IF;
    END LOOP;
END LOOP; return TRUE;
}
```

We claim:

1. A method of collecting, storing, and retrieving data in a multi-tier database management system having a master database server (4), an application server (303), at least one workgroup server (315), and a plurality of workgroup user clients (310), said application server (303) and said workgroup server (315) interposed between said master database server (4) and said workgroup user clients (310), said method comprising:

(a) creating a transaction in a local database resident on one of said workgroup user clients (310), (b) entering the transaction into a transaction log resident on said workgroup user client (310), (c) creating a transaction file corresponding thereto in an outbox of said workgroup user client (310);

(d) copying said transaction file to an inbox on said workgroup server (315) identified to the workgroup user client (310), (e) updating said transaction file into a workgroup database (305) resident on said workgroup server (315), said workgroup database (305) including a transaction log;

(f) reading said workgroup database (305) transaction log while skipping those transactions which originate at the master database server (4), (g) creating data files corresponding to the entries therein, (h) copying data files corresponding to transactions originating at the workgroup user client (310) to an inbox on the master database server (4) corresponding to the workgroup server (315), and (i) updating the transactions into a master database (3) on the master database server (4).

2. The method of claim 1 comprising carrying out in the workgroup user client one or more of (a) creating a transaction in a local database resident on one of said workgroup user clients (310), (b) entering the transaction into a transaction log resident on said workgroup user client (310), or (c) creating a transaction file corresponding thereto in an outbox of said workgroup user client (310).

3. The method of claim 1 comprising carrying out in the workgroup server one or more of (d) copying said transaction file to an inbox on said workgroup server (315) identified to the workgroup user client (310), and (e) updating said transaction file into a workgroup database (305) resident on said workgroup server (315), said workgroup database (305) including a transaction log.

4. The method of claim 1 comprising carrying out in the master database server one or more of (f) reading said workgroup database (305) transaction log while skipping those transactions which originate at the master database server (4), (g) creating data files corresponding to the entries therein, (h) copying data files corresponding to transactions originating at the workgroup user client (310) to an inbox on the master database server (4) corresponding to the workgroup server (315), and (i) updating the transactions into a master database (3) on the master database server (4).

5. The method of claim 1 comprising:

(1) carrying out in the workgroup user client one or more of (a) creating a transaction in a local database resident on one of said workgroup user clients (310), (b) entering the transaction into a transaction log resident on said workgroup user client (310), or (c) creating a transaction file corresponding thereto in an outbox of said workgroup user client (310);

(2) carrying out in the workgroup server one or more of (d) copying said transaction file to an inbox on said workgroup server (315) identified to the workgroup user client (310), and (e) updating said transaction file into a workgroup database (305) resident on said workgroup server (315), said workgroup database (305) including a transaction log; and (3) carrying out in the master database server one or more of (f) reading said workgroup database (305) transaction log while skipping those transactions which originate at the master database server (4), (g) creating data files corresponding to the entries therein, (h) copying data files corresponding to transactions originating at the workgroup user client (310) to an inbox on the master database server (4) corresponding to the workgroup server (315), and (i) updating the transactions into a master database (3) on the master database server (4).

6. An article of manufacture comprising a computer usable medium having computer readable program code means embodied therein for collecting, storing, and retrieving data in a multi-tier data base management system having a master database server (4), an application server (303), at least one workgroup server (315), and a plurality of workgroup user clients (310), said application server (303) and said workgroup server (315) interposed between said master database server (4) and said workgroup user clients (310), the computer readable program in said article of manufacture comprising computer readable program code for causing a computer to effect:

(a) creating a transaction in a local database resident on one of said workgroup user clients (310), (b) entering the transaction into a transaction log resident on said workgroup user client (310), (c) creating a transaction file corresponding thereto in an outbox of said workgroup user client (310);

(d) copying said transaction file to an inbox resident on said workgroup server (315) and identified to the workgroup user client (310), (e) updating said transaction file into a workgroup database (305) resident on said workgroup server (315), said workgroup database (305) including a transaction log;

(f) reading said workgroup database (305) transaction log while skipping those transactions which originate at the master database server (4), (g) creating data files corresponding to the entries therein, (h) copying data files corresponding to an transactions originating at the workgroup user client (310) to an inbox on the master database server (4) corresponding to the workgroup server (315), and (i) updating the transactions into a master database (3) on the master database server (4).

7. The article of manufacture of claim 6 wherein said computer readable program code causes a computer to effect in the workgroup user client one or more of (a) creating a transaction in a local database resident on one of said workgroup user clients (310), (b) entering the transaction into a transaction log resident on said workgroup user client (310), or (c) creating a transaction file corresponding thereto in an outbox of said workgroup user client (310).

8. The article of manufacture of claim 6 wherein said computer readable program code causes a computer to effect in the in the workgroup server one or more of (d) copying said transaction file to an inbox on said workgroup server (315) identified to the workgroup user client (310), and (e) updating said transaction file into a workgroup database (305) resident on said workgroup server (315), said workgroup database (305) including a transaction log.

9. The article of manufacture of claim 6 wherein said computer readable program code causes a computer to effect in the master database server one or more of (f) reading said workgroup database (305) transaction log while skipping those transactions which originate at the master database server (4), (g) creating data files corresponding to the entries therein, (h) copying data files corresponding to transactions originating at the workgroup user client (310) to an inbox on the master database server (4) corresponding to the workgroup server (315), and (i) updating the transactions into a master database (3) on the master database server (4).

10. The article of manufacture of claim 6 wherein the computer readable program code causes the computer to effect:
   (1) carrying out in the workgroup user client one or more of (a) creating a transaction in a local database resident on one of said workgroup user clients (310), (b) entering the transaction into a transaction log resident on said workgroup user client (310), or (c) creating a transaction file corresponding thereto in an outbox of said workgroup user client (310);
   (2) carrying out in the workgroup server one or more of (d) copying said transaction file to an inbox on said workgroup server (315) identified to the workgroup user client (310), and (e) updating said transaction file into a workgroup database (305) resident on said workgroup server (315), said workgroup database (305) including a transaction log; and
   (3) carrying out in the master database server one or more of (f) reading said workgroup database (305) transaction log while skipping those transactions which originate at the master database server (4), (g) creating data files corresponding to the entries therein, (h) copying data files corresponding to transactions originating at the workgroup user client (310) to an inbox on the master database server (4) corresponding to the workgroup server (315), and (i) updating the transactions into a master database (3) on the master database server (4).

11. A program storage device readable by a machine, tangibly embodying a program of instructions executable by a machine to perform method steps for collecting, storing, and retrieving data in a multi-tier data base management system having a master database server (4), an application server (303), at least one workgroup server (315), and a plurality of workgroup user clients (310), said application server (303) and said workgroup server (315) interposed between said master database server (4) and said workgroup user clients (310), said method steps comprising:
   (i) creating a transaction in a local database resident on the one of said workgroup user clients (310),
   (ii) entering the transaction into a transaction log resident on the workgroup user client (310), and creating a transaction file corresponding thereto in an outbox of the workgroup user client (310);
   (iii) copying said transaction file to an inbox resident on the workgroup server (315) and identified to the workgroup user client (310),
   (iv) updating said transaction file into a workgroup database (305) resident on said workgroup server (315), said workgroup database (305) including a transaction log;
   (v) reading said workgroup database (305) transaction log while skipping those transactions which originate at the master database server (4),
   (vi) creating data files corresponding to the entries therein,
   (vii) copying data files corresponding to transactions originating at the workgroup user client (310) to an inbox on the master database server (4) corresponding to the workgroup server (315), and
   (viii) updating the transactions into a master database (3) on the master database server (4).

12. The program storage device of claim 11 further comprising:
   (a) on one of said work group user clients: (i) creating a transaction in a local database resident on the one of said workgroup user clients (310), (ii) entering the transaction into a transaction log resident on the workgroup user client (310), and creating a transaction file corresponding thereto in an outbox of the workgroup user client (310);
   (b) on said workgroup server: (i) copying said transaction file to an inbox resident on the workgroup server (315) and identified to the workgroup user client (310), and (ii) updating said transaction file into a workgroup database (305) resident on said workgroup server (315), said workgroup database (305) including a transaction log; and
   (c) on said master database server: (i) reading said workgroup database (305) transaction log while skipping those transactions which originate at the master database server (4), (ii) creating data files corresponding to the entries therein, (iii) copying data files corresponding to transactions originating at the workgroup user client (310) to an inbox on the master database server (4) corresponding to the workgroup server (315), and (iv) updating the transactions into a master database (3) on the master database server (4).

13. The program storage device of claim 11 further comprising:
   (a) on one of said work group user clients: (i) creating a transaction in a local database resident on the one of said workgroup user clients (310), (ii) entering the transaction into a transaction log resident on the workgroup user client (310), and creating a transaction file corresponding thereto in an outbox of the workgroup user client (310).

14. The program storage device of claim 11 further comprising:
   (a) on said workgroup server: (i) copying said transaction file to an inbox resident on the workgroup server (315) and identified to the workgroup user client (310), and (ii) updating said transaction file into a workgroup database (305) resident on said workgroup server (315), said workgroup database (305) including a transaction log.

15. The program storage device of claim 11 further comprising:
   (a) on said master database server: (i) reading said workgroup database (305) transaction log while skipping those transactions which originate at the master database server (4), (ii) creating data files corresponding to the entries therein, (iii) copying data files corresponding to transactions originating at the workgroup user client (310) to an inbox on the master database server (4) corresponding to the workgroup server (315), and (iv) updating the transactions into a master database (3) on the master database server (4).

16. A system for managing a database residing in a multitier data base management system having a master database server (4), an application server (303), at least one workgroup server (315), and a plurality of workgroup user clients (310), said application server (303) and said workgroup server (315) interposed between said master database server (4) and said workgroup user clients (310), the system being configured to effect:

(a) creating a transaction in a local database resident on one of said workgroup user clients (310), (b) entering the transaction into a transaction log resident on said workgroup user client (310), (c) creating a transaction file corresponding thereto in an outbox of said workgroup user client (310);

(d) copying said transaction file to an inbox resident on said workgroup server (315) and identified to the workgroup user client (310), (e) updating said transaction file into a workgroup database (305) resident on said workgroup server (315), said workgroup database (305) including a transaction log;

(f) reading said workgroup database (305) transaction log while skipping those transactions which originate at the master database server (4), (g) creating data files corresponding to the entries therein, (h) copying data files corresponding to transactions originating at the workgroup user client (310) to an inbox on the master database server (4) corresponding to the workgroup server (315), and (i) updating the transactions into a master database (3) on the master database server (4).

17. The system of claim 16 wherein said system is configured to effect a computer to carry out in the workgroup user client one or more of (a) creating a transaction in a local database resident on one of said workgroup user clients (310), (b) entering the transaction into a transaction log resident on said workgroup user client (310), or (c) creating a transaction file corresponding thereto in an outbox of said workgroup user client (310).

18. The system of claim 16 wherein said system is configured to effect a computer to carry out in the in the workgroup server one or more of (d) copying said transaction file to an inbox on said workgroup server (315) identified to the workgroup user client (310), and (e) updating said transaction file into a workgroup database (305) resident on said workgroup server (315), said workgroup database (305) including a transaction log.

19. The system of claim 16 wherein said system is configured to effect a computer to carry out in the master database server one or more of (f) reading said workgroup database (305) transaction log while skipping those transactions which originate at the master database server (4), (g) creating data files corresponding to the entries therein, (h) copying data files corresponding to transactions originating at the workgroup user client (310) to an inbox on the master database server (4) corresponding to the workgroup server (315), and (i) updating the transactions into a master database (3) on the master database server (4).

20. The system of claim 16 wherein the system is configured to effect the computer to carry out:

(1) in the workgroup user client one or more of (a) creating a transaction in a local database resident on one of said workgroup user clients (310), (b) entering the transaction into a transaction log resident on said workgroup user client (310), or (c) creating a transaction file corresponding thereto in an outbox of said workgroup user client (310);

(2) in the workgroup server one or more of (d) copying said transaction file to an inbox on said workgroup server (315) identified to the workgroup user client (310), and (e) updating said transaction file into a workgroup database (305) resident on said workgroup server (315), said workgroup database (305) including a transaction log; and (3) in the master database server one or more of (f) reading said workgroup database (305) transaction log while skipping those transactions which originate at the master database server (4), (g) creating data files corresponding to the entries therein, (h) copying data files corresponding to transactions originating at the workgroup user client (310) to an inbox on the master database server (4) corresponding to the workgroup server (315), and (i) updating the transactions into a master database (3) on the master database server (4).

\* \* \* \* \*